US011146583B2

(12) United States Patent
Nhlabatsi et al.

(10) Patent No.: US 11,146,583 B2
(45) Date of Patent: Oct. 12, 2021

(54) THREAT-SPECIFIC SECURITY RISK EVALUATION FOR NETWORKED SYSTEMS

(71) Applicants: Qatar University, Doha (QA); Qatar Foundation for Education, Science and Community Development, Doha (QA)

(72) Inventors: Armstrong Nhlabatsi, Doha (QA); Jin Hong, Doha (QA); Dong Seong Kim, Doha (QA); Rachael Fernandez, Doha (QA); Alaa Hussein, Doha (QA); Noora Fetais, Doha (QA); Khaled M. Khan, Doha (QA)

(73) Assignees: QATAR FOUNDATION FOR EDUCATION, SCIENCE AND COMMUNITY DEVELOPMENT, Doha (QA); QATAR UNIVERSITY, Doha (QA)

( * ) Notice: Subject to any disclaimer, the term of this patent is extended or adjusted under 35 U.S.C. 154(b) by 106 days.

(21) Appl. No.: 16/400,517

(22) Filed: May 1, 2019

(65) Prior Publication Data

US 2020/0351295 A1 Nov. 5, 2020

(51) Int. Cl.
*G06F 21/00* (2013.01)
*H04L 29/06* (2006.01)

(52) U.S. Cl.
CPC ...... *H04L 63/1433* (2013.01); *H04L 63/1441* (2013.01); *H04L 63/205* (2013.01)

(58) Field of Classification Search
CPC ............ H04L 63/1408; H04L 63/1441; H04L 63/1425; H04L 63/145; H04L 63/02; H04L 63/1433; H04L 63/20; H04L 63/205
See application file for complete search history.

(56) References Cited

U.S. PATENT DOCUMENTS

| | | | |
|---|---|---|---|
| 6,374,358 B1 | 4/2002 | Townsend | |
| 7,895,448 B1 * | 2/2011 | Satish | G06F 21/577 713/188 |
| 8,862,948 B1 | 10/2014 | Lam | |
| 9,141,805 B2 | 9/2015 | Giakouminakis et al. | |
| 9,215,158 B1 * | 12/2015 | Adogla | G06F 11/008 |
| 9,426,169 B2 | 8/2016 | Zandani | |
| 9,462,010 B1 * | 10/2016 | Stevenson | H04L 63/0218 |
| 9,930,062 B1 | 3/2018 | Alkemper et al. | |

(Continued)

*Primary Examiner* — Ghazal B Shehni
(74) *Attorney, Agent, or Firm* — K&L Gates LLP

(57) ABSTRACT

The presently disclosed technology provides a threat-specific network risk evaluation tailored to a client's security objectives. The present technology may include identifying a plurality of threats to a first component of a networked system and assigning a plurality of weighting values to the plurality of threats according to the client's security objectives. The present technology may include identifying a plurality of vulnerabilities of the first component and determining a set of relevant threats for the first vulnerability based on the nature of the vulnerability and the weighting values assigned to the plurality of threats. The set of relevant threats includes one or more of the plurality of threats. The present technology may include determining a set of relevant threats for each of the identified vulnerabilities of the first component and calculating a risk of the first component based on the sets of the relevant threats.

18 Claims, 12 Drawing Sheets

(56) References Cited

U.S. PATENT DOCUMENTS

| | | | |
|---|---|---|---|
| 2010/0125911 A1* | 5/2010 | Bhaskaran | G06Q 10/10 |
| | | | 726/23 |
| 2013/0074188 A1* | 3/2013 | Giakouminakis | H04L 63/1433 |
| | | | 726/25 |
| 2013/0298192 A1* | 11/2013 | Kumar | G06F 21/52 |
| | | | 726/3 |
| 2018/0121657 A1 | 5/2018 | Hay et al. | |

\* cited by examiner

FIG. 8

THREAT-SPECIFIC SECURITY RISK EVALUATION FOR NETWORKED SYSTEMS

BACKGROUND

The present disclosure relates generally to threat-specific security risk evaluation for networked systems and selecting appropriate countermeasures against potential threats.

Cloud computing allows users, such as companies, governments, and individuals, to outsource their computing needs (software, hardware, storage, etc.) for improved scalability and better management of their computing resources and data. However, it also attracts a wide range of different cyber-attacks. Types of cloud computing attacks vary depending on the security objectives that attackers aim to exploit, the type of assets to compromise, and the threats they pose. Therefore, in a multi-client cloud computing scenario, in which many clients use the same cloud, a 'one-size-fits-all' security assurance model to protect all clients may not be sufficient to satisfy all clients with their diverse security requirements and needs.

Different organizations have different specific security requirements while using common resources of cloud computing. For example, one client's main security objective may be service availability whereas a second client's main security objective may be data integrity. The nature of each client's assets and what is to be protected dictates the client's security requirements. Being more concerned about a specific security requirement, however, does not mean that other security requirements should not be considered at all. They should be considered, but with less importance in comparison to more important security requirements. Different clients can prioritize their security requirements based on the characteristics of their organizational security objectives. Hence, even though a cloud service provider usually achieves basic security goals such as confidentiality, integrity, and availability, different clients may have other prioritized or additional security requirements for their outsourced computing needs.

In addition, different attacks are associated with different threats in cloud computing systems, where the importance of each threat may vary based on the security requirements of different clients using the cloud services. Generic asset-based risk evaluation approaches capture the risk of all threats posed to an asset as a whole, but they fail to differentiate the varying degree of importance between the threats for a client. This "one-size-fits all" approach makes it difficult for security administrators to make fine-grained decisions in order to define appropriate security strategies (i.e., countermeasures) for a client. Specifically, without security risk quantification for specific threats, security administrators have no concrete guidance on how much defense resources to spend on each type of threat. As such, generic asset-based approaches may result in inaccurate risk quantification followed by less effective risk mitigation countermeasures.

SUMMARY

The present disclosure relates generally to threat-specific security risk evaluation for networked systems and selecting appropriate countermeasures against potential threats. The present disclosure provides an improved method, system, and apparatus for network security risk evaluation that use networked system component vulnerability information from the perspective of specific threats posed to each component and a client's security objectives in order to provide a threat-specific risk evaluation, according to an embodiment. The present technology enables security administrators of the cloud provider to develop effective countermeasures or mitigation strategies specific to the perceived threats posed to the computing assets of a specific client, according to an embodiment. The present technology helps security administrators prioritize the identified threats depending on the severity of their risk, according to an embodiment. The computation process of the present disclosure, in an embodiment, may use the relative importance of the identified threats, the probability of an attack, and the impact of such attack (if materialized) as its initial input. The present technology enables security administrators to identify threats relevant to a given client, and evaluate only the security risk with respect to those threats, which results in a more accurate security risk evaluation and an appropriate allocation of mitigation resources, according to an embodiment.

In various embodiments, the present technology provides assigning weighting factors to threats in order to differentiate the importance of one threat from another for a specific client. Through the assignment of weighting factors, the present technology, in an embodiment, ensures that security administrators do not consider threats not relevant to satisfying a client security objective in the risk evaluation, even if the risk evaluation indicates that those threats pose risk. In at least one embodiment, the present technology may include a risk evaluation software tool that automates client networked system topology modeling, vulnerability data collection for each system component, and threat-specific risk computation.

In one embodiment of the present disclosure, a method for providing network security risk evaluation may include identifying a plurality of threats to a first component of a networked system and assigning a plurality of weighting values to those plurality of threats. The method may then include identifying a plurality of vulnerabilities of the first component and determining a relevant threat set for a first vulnerability from the plurality of vulnerabilities based on the first vulnerability and the plurality of weighting values assigned to the plurality of threats. The relevant threat set may include one or more of the plurality of threats identified for the first component. The method may then include identifying relevant threat sets for each vulnerability identified for the first component. The method may then include calculating a component risk of the first component based on the relevant threat sets.

In one embodiment of the present disclosure, a network security risk evaluation apparatus may include a processor and a memory storing instructions which, when executed by the processor, may cause the processor to identify a plurality of threats to a first component of a networked system and assign a plurality of weighting values to those plurality of threats. The instructions may then cause the processor to identify a plurality of vulnerabilities of the first component and determine a relevant threat set for a first vulnerability from the plurality of vulnerabilities based on the first vulnerability and the plurality of weighting values assigned to the plurality of threats. The relevant threat set may include one or more of the plurality of threats identified for the first component. The instructions may then cause the processor to identify relevant threat sets for each vulnerability identified for the first component. The instructions may then cause the processor to calculate a component risk of the first component based on the relevant threat sets.

In one embodiment of the present disclosure, a non-transitory, computer-readable medium may store instructions which, when performed by a processor, may cause a processor to identify a plurality of threats to a first component of a networked system and assign a plurality of weighting values to those plurality of threats. The instructions may then cause the processor to identify a plurality of vulnerabilities of the first component and determine a relevant threat set for a first vulnerability from the plurality of vulnerabilities based on the first vulnerability and the plurality of weighting values assigned to the plurality of threats. The relevant threat set may include one or more of the plurality of threats identified for the first component. The instructions may then cause the processor to identify relevant threat sets for each vulnerability identified for the first component. The instructions may then cause the processor to calculate a component risk of the first component based on the relevant threat sets.

BRIEF DESCRIPTION OF THE FIGURES

FIG. 8 illustrates an example embodiment of a screen of a user interface of a software tool for inputting details about a component being added to a networked system model according to the present disclosure.

Figure 1:
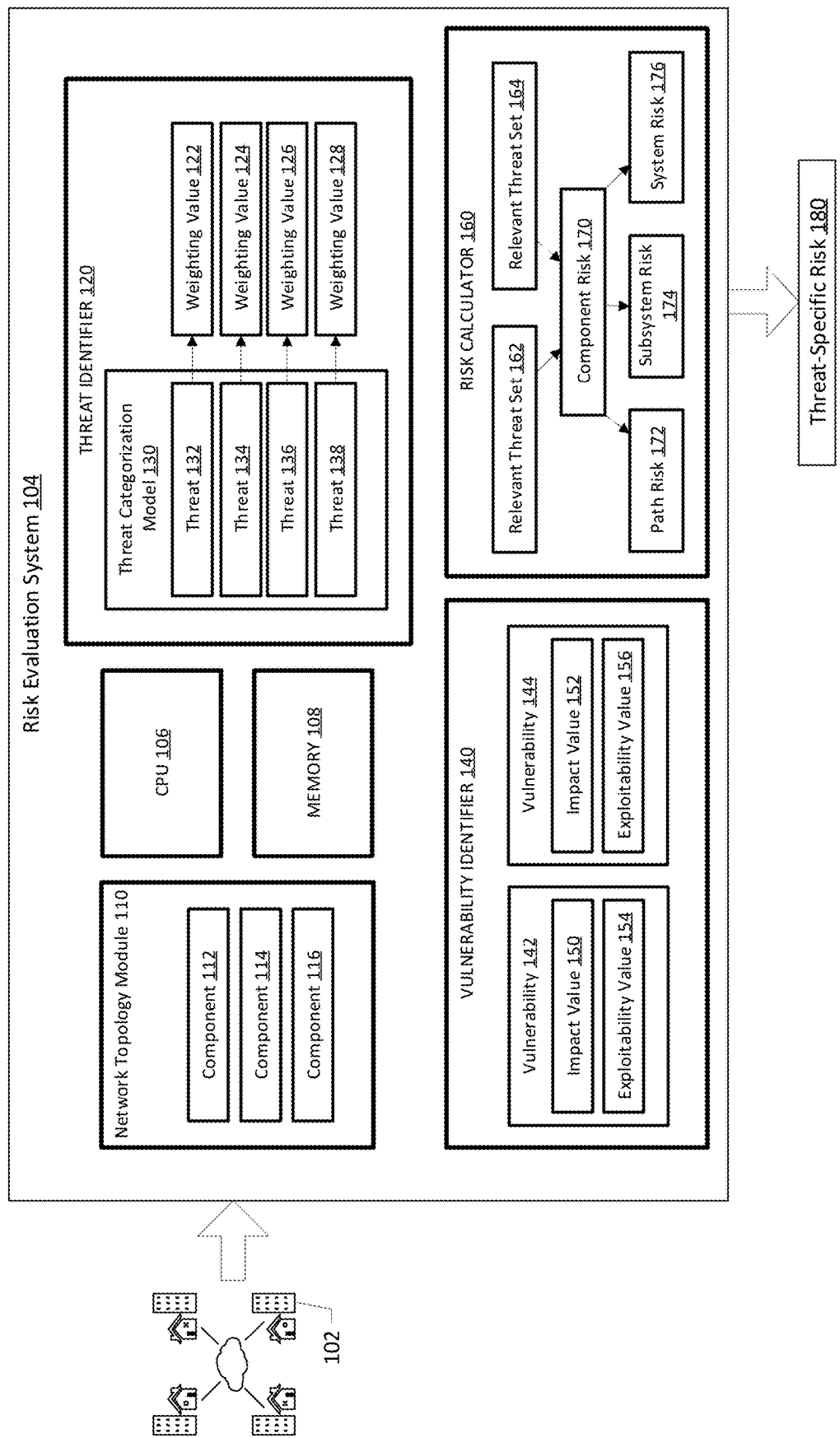
FIG. 1 illustrates an example embodiment of a system of the present disclosure.

The reader will appreciate the foregoing details, as well as others, upon considering the following detailed description of certain non-limiting embodiments according to the present disclosure.

DETAILED DESCRIPTION

The present disclosure relates generally to threat-specific security risk evaluation for networked systems and selecting appropriate countermeasures against potential threats. In an embodiment, a method, system, and apparatus for providing threat-specific risk evaluations tailored to a client's cloud computing security objectives are provided. For example, maintaining confidentiality and integrity of patient records in the cloud may be the major security requirements of a hospital. On the other hand, an online newspaper using a cloud service may prioritize high availability and integrity of news as its major security requirements. Therefore, even though the hospital and the online newspaper will be using the same cloud computing system, different amounts of importance are placed on preventing various attacks to the respective systems based on the different security objectives. A single, standard risk evaluation approach for both would not yield the most effective security strategy for either. It should be appreciated that the present technology can be applied to any suitable computing application and is not limited to healthcare and newspaper company systems as used in the preceding and ensuing examples. The present technology allows for tailored risk evaluations specific to the importance of threats to a client and based on the client's networked system, the system's components' vulnerabilities, and the client's security objectives, according to an embodiment. Appropriate countermeasures may then be selected in accordance with the weighted importance of identified threats to the client, in at least one embodiment.

Reference is made herein to vulnerabilities. As disclosed herein, vulnerabilities may refer to any type of weakness of an asset or group of assets in a computer system, networked system, or other system, that can be exploited by a threat actor, such as an attacker, to perform unauthorized actions within a computer system. A vulnerability may be a flaw or weakness in a system's design, implementation, or operation and management, among other flaws or weaknesses. To exploit a vulnerability, an attacker must have at least one applicable tool or technique that can connect to a system vulnerability. Reference is also made herein to threats. As disclosed herein, threats may refer to any unwanted and unauthorized actions within a system. Vulnerabilities may pose a specific threat and/or any number of threats. Reference is also made herein to risk (i.e., security risk). As disclosed herein, risk is the potential of significant impact resulting from the exploitation of a vulnerability. Reference is further made herein to countermeasures. As disclosed herein, countermeasures may refer to any action, device, procedure, or technique that reduces the risk of a threat, a vulnerability, or an attack by eliminating or preventing it, by minimizing the harm it can cause, or by discovering and reporting it so that corrective action can be taken.

Reference is also made herein to clients. As disclosed herein, a client may refer to any party which utilizes a networked system and requires security measures to protect that networked system. Reference is further made herein to security administrators. As disclosed herein, security administrators may be any party responsible for the security of a networked system. For example, a security administrator may be a cloud computing service provider that provides cloud computing services to a client.

It should be understood that the present technology is not restricted to cloud computing, but is equally applicable to all suitable networked systems. The present technology generally enables security administrators of any organization (cloud and non-cloud based systems, such as an enterprise network without any virtualization) to evaluate components, subsystems, systems, and path risks from the perspective of a particular threat or a set of threats associated with a client's specific security requirements, according to an embodiment.

The presently disclosed threat-specific approach is in contrast with generic asset-based approaches that only compute a holistic risk value, which restricts risk mitigation to general countermeasures that may not be effective for specific threats to a client, according to an embodiment.

System Embodiment

FIG. 1 illustrates an embodiment of the system 100 that provides for threat-specific risk evaluations, according to an example embodiment of the present disclosure. The architecture of a client networked system 102 is analyzed and modeled by a risk evaluation system 104, which then computes a threat specific risk 180, according to an embodiment. The risk evaluation system 104 includes different components that are representative of computational processes, routines, and/or algorithms. In some embodiments, the computational processes, routines, and/or algorithms may be specified in one or more instructions stored on a computer readable medium that, when executed by a processor of the risk evaluation system 104, cause the risk evaluation system 104 to perform the operations discussed below. For example, all or part of the computational processes, routines, and/or algorithms may be implemented by the CPU 106 and the memory 108. It should be appreciated that in other embodiments the components of the risk evaluation system 104 may be combined, rearranged, removed, or provided on a separate device or server.

The example risk evaluation system 104 may include a network topology module 110 configured to model a client networked system 102 and store the various components 112, 114, 116 that construct the client networked system 102. The components 112, 114, 116 that make up the client networked system 102 are the base units of the presently disclosed method for determining threat-specific risk evaluations, which will be discussed in more detail below. The risk evaluation system 104 may also include a threat identifier 120 configured to store and use a threat categorization model 130 to identify threats to each of the components 112, 114, 116 of the client networked system 102, for example, threats 132, 134, 136, 138. The threat identifier 120 may also store weighting values, for example, weighting values 122, 124, 126, 128, that are assigned to each of the identified threats 132, 134, 136, 138 to each of the components 112, 114, 116 based on the client's security objectives. For example, weighting value 122 may be assigned to threat 132, weighting value 124 may be assigned to threat 134, weighting value 126 may be assigned to threat 136, and weighting value 128 may be assigned to threat 138. It should be appreciated that a client networked system 102 may have any number of components 112, 114, 116, identified threats 132, 134, 136, 138, and weighting values 122, 124, 126, 128.

The example risk evaluation system 104 may include a vulnerability identifier 140 configured to identify the vulnerabilities 142, 144 of each of the components 112, 114, 116. Each vulnerability is associated with an impact value 150, 152 and an exploitability value 154, 156. For example, vulnerability 142 may have an impact value 150 and an exploitability value 154, and vulnerability 144 may have an impact value 152 and an exploitability value 156.

The example risk evaluation system 104 may also include a risk calculator 160 configured to generate relevant threat sets 162, 164 for each vulnerability 142, 144 of each component 112, 114, 116 and to calculate a component risk 170 for each component 112, 114, 116 based on its relevant threat set 162, 164. Utilizing the component risk 170 of one or more components 112, 114, 116, the risk calculator may also calculate a path risk 172, a subsystem risk 174, or a system risk 176 of the client networked system 102. The risk evaluation system 104 may then output a threat-specific risk 180 tailored to the client's needs. A threat-specific risk 180 may include one or more component risks 170, one or more path risks 172, one or more subsystem risks 174, and/or a system risk 176. For example, a client may only be concerned with the component risk 170 of a single component 112, 114, 116 or only with a certain subset of identified threats 132, 136 and the threat-specific risk 180 would reflect those concerns.

It should be appreciated that while throughout this disclosure a system component 112, 114, 116, such as a VM, is treated as the most basic element of the client networked system 102, a component 112, 114, 116 may have subcomponents, such as applications or files. Thus, it should be understood that the present technology may be applied to determine a subcomponent risk of each of the subcomponents in a similar manner. For example, the subcomponent risk to a file containing passwords may be higher than a file of an organizational chart. It should also be appreciated that throughout this disclosure only a single attacker, single attack entry point, and a single target are considered, but the present technology may be used to evaluate risk with regard to multiple attackers, entry points, and/or targets. Further detail regarding the components of the risk evaluation system 104 and their respective functions is provided below.

Component Risk Embodiment

Figure 2:
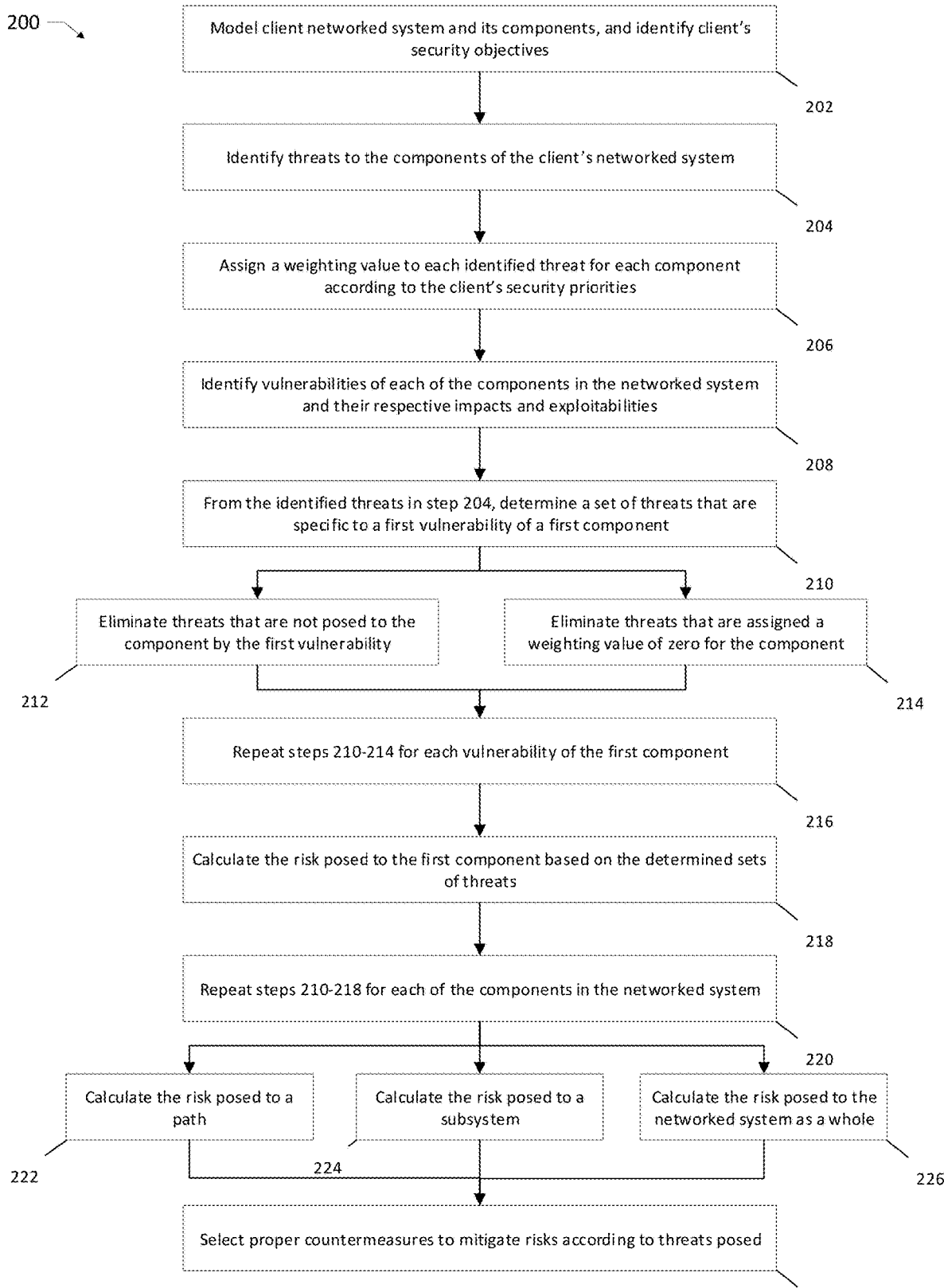
FIG. 2 illustrates an example embodiment of a method for calculating threat-specific risk of a networked system and selecting effective countermeasures according to the present disclosure.

FIG. 2 illustrates an example embodiment of a method 200 of the present disclosure. The method 200 may be implemented on a computer system, such as the system 100. For example, the method 200 may be implemented by the network topology module 110, the threat identifier 120, the vulnerability identifier 140, and/or the risk calculator 160. The method 200 may also be implemented by a set of instructions stored on a computer readable medium that, when executed by a processor, cause the computer system to perform the method 200. For example, all or part of the method 200 may be implemented by the CPU 106 and the memory 108. Although the examples below are described with reference to the flowchart illustrated in FIG. 2, many other methods of performing the acts associated with FIG. 2 may be used. For example, the order of some of the blocks may be changed, certain blocks may be combined with other blocks, one or more of the blocks may be repeated, and some of the blocks described may be optional. Reference is made herein to multiple equations and symbols. Table 1 below includes definitions for all symbols used as disclosed herein.

TABLE 1

| SYMBOL | DEFINITION |
|---|---|
| $\mathbb{N}$ | The set of all components/nodes in the cloud system, $\mathbb{N} = \{\eta_1, \eta_2, \eta_3 \ldots, \eta_i\}$ |
| $\mathbb{E}$ | Set of all connections between components in the cloud system, $\mathbb{E} \subseteq \{\mathbb{N} \times \mathbb{N}\}$. |

TABLE 1-continued

| SYMBOL | DEFINITION |
|---|---|
| $\Phi$ | A set of STRIDE threats, $\Phi = \{S, T, R, I, D, E\}$ |
| t | A single threat in the STRIDE threats, $t \in \Phi$ |
| $2^\Phi$ | {The power set of $\Phi$, $2^\Phi$ ~ $\{S\}, \{T\}, \{R\}, \{I\}, \{D\}, \{E\}$, $\{S, T\}, \{S, R\}, \{S, I\}, \ldots, \{S, T, R, I, D, E\}\}$ |
| $\Omega$ | A cloud system consisting of a network of nodes and connections, $\Omega = \{\mathbb{N}, \mathbb{E}\}$ |
| $\Theta\kappa$ | A subset of the components in the cloud system associated with a sub-system, $\Theta\kappa \subseteq \mathbb{N}$. |
| $\Psi\kappa$ | A subset of the connections in the cloud system associated with a sub-system, $\Psi\kappa \subseteq \mathbb{E}$ |
| $N\kappa$ | A cloud sub-system $N\kappa = \{\Theta\kappa, \Psi\kappa\}$. |
| $\eta_i$ | A component in a cloud system/sub-system, $\eta_i \in \mathbb{V}$. |
| $\mathbb{V}$ | The set of all vulnerabilities in the cloud system. |
| $v_j$ | A $j^{th}$ vulnerability in a component of a cloud system, such that $v_j \in \mathbb{V}$ |
| $\alpha_{vj}$ | Impact of a vulnerability $v_j$. |
| $\beta_{vj}$ | Probability of successful exploitation of vulnerability $v_j$. |
| $\gamma_{vj}$ | Set of all threats that can exploit vulnerability $v_j$, where $\gamma_{vj} \in 2^\Phi$. |
| $\kappa$ | A set of selected threats for the risk evaluation given $\kappa \in 2^\Phi$. |
| $\lambda(\eta_i)$ | Returns the impact on component $\eta_i$ - calculated from the set of vulnerabilities in the component. |
| $\mu(\eta_i)$ | Returns the probability of a successful attack on component - calculated from the set of vulnerabilities. |
| $V(\eta_i)$ | Returns set of vulnerabilities in component $\eta_i$, where $V(\eta_i) \subseteq \mathbb{V}$. |
| $\Gamma(\eta_i)$ | Returns set of threats in component $\eta_i$, where $\Gamma(\eta_i) \in 2^\Phi$. |
| $\omega(\eta_i, t)$ | The impact weighting of component $\eta_i$ (as set by the security administrator) from the perspective of one of the STRIDE threats, $t \in \Phi$. The impact weighting depends on client security requirements. |
| Paths | A set of attack Paths between an attack entry point, $\delta \in \mathbb{N}$, and an attack target $\eta \in \mathbb{N}$, in the cloud system. |
| $\chi^\iota$ | A subset of the components in the cloud system associated with an attack path, $\chi^\iota \subseteq \mathbb{N}$ |
| $\sigma^\iota$ | A subset of the connections in the cloud system associated with an attack path, $\sigma^\iota \subseteq \mathbb{E}$ |
| $Path_1$ | The attack path $Path_1$ in the cloud system consisting of components ($\chi^\iota$) and connections ($\sigma^\iota$), such that $Path_1 \in Paths$ and $Path_1 = \{\chi^\iota, \sigma^\iota\}$. |
| $Risk(\Omega)$ | Computes the risk of a cloud system taking into account all threats. |
| $Risk(\Omega, \kappa)$ | Computes the risk of a cloud system considering a subset of threats $\kappa$. |
| $Risk(N_k)$ | Computes the risk in a cloud sub-system considering all threats. |
| $Risk(N_k, \kappa)$ | Computes the risk of the cloud sub-system considering a subset of the threats $\kappa$. |
| $Risk(\eta_i)$ | Computes the risk of a cloud component considering all threats. |
| $Risk(\eta_i, \kappa)$ | Computes the risk of a component in a cloud system considering a subset of threats $\kappa$. |
| $Risk(Path_1)$ | Computes the risk of $Path_1$ in the cloud system. |
| $Risk(Path_1, \kappa)$ | Computes the risk of $Path_1$ in the cloud system considering a subset of threats $\kappa$. |

Figure 10:
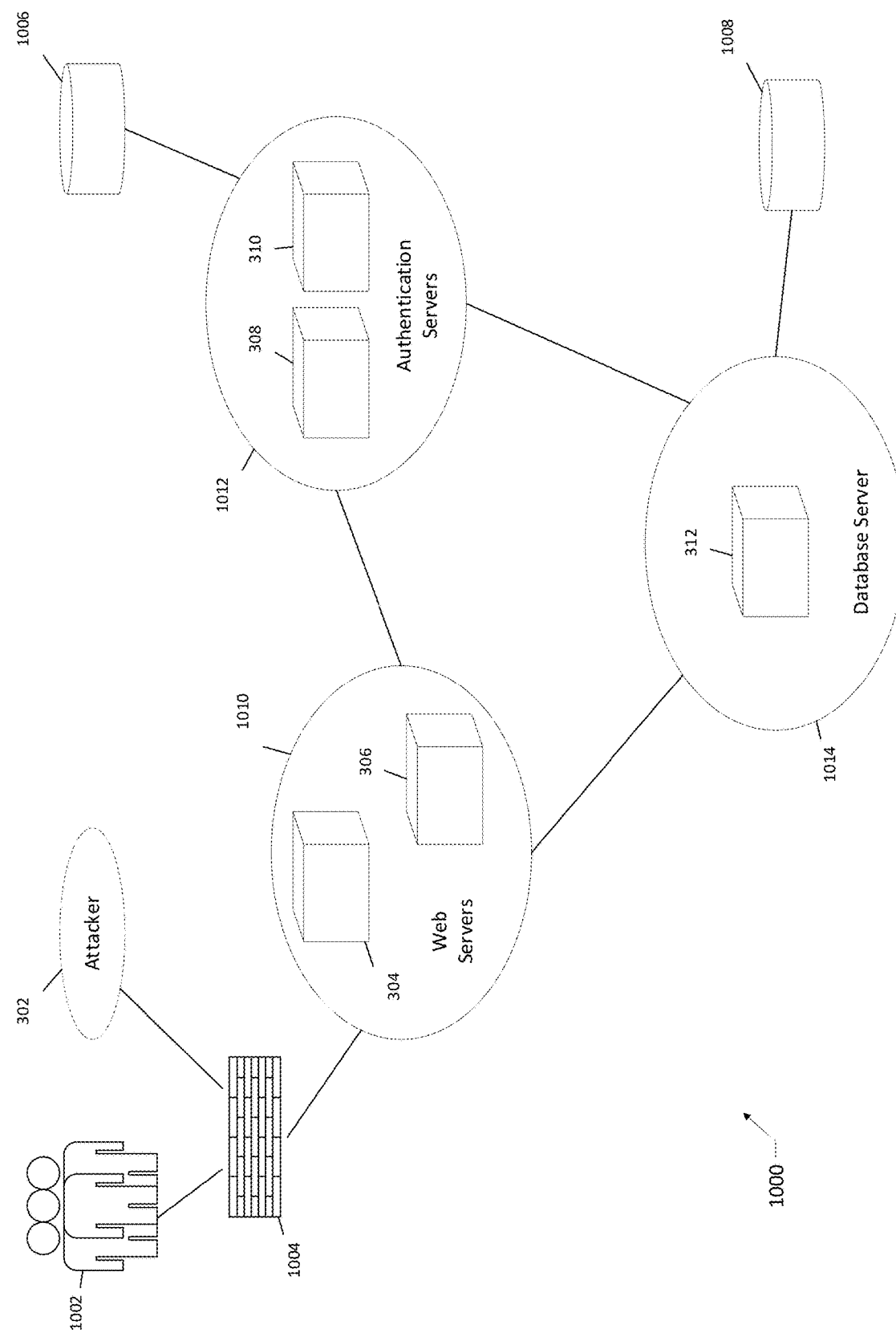
FIG. 10 illustrates an example embodiment of a SaaS cloud system for a patient medical records management application used by a hospital of the present disclosure.

In various embodiments, the client's security objectives and the architecture/topology of the client networked system 102 are first analyzed to identify all of its components 112, 114, 116, how they are networked together, and their importance (step 202). A component 112, 114, 116 may be a single node in a network, such as, for example, a virtual machine ("VM"). The network topology module 110 at step 202 may then be used to model the client networked system 102 and store each of the components 112, 114, 116, or nodes. In an embodiment, routing tables may be used to identify which nodes are allowed to send packets to each other in the client networked system 102, and nodes sending data to each other are connected with edges to represent reachability between them. In at least one embodiment, the network topology module 110 may utilize an example risk evaluation software tool 510 (FIG. 5) which automates the network modeling process after the components 112, 114, 116 are identified, and is discussed in more detail below. It should be appreciated that other suitable network data elicitation tools may also be used to model the client networked system 102 in place of the example risk evaluation software tool 510. For example, Nmap is one such suitable network data elicitation tool for mapping/modeling a network. An example model topology of a client networked system 102 is illustrated in FIG. 10, which will also be discussed in more detail below. Modeling a client networked system 102 is performed because it identifies how an attacker 302 (FIG. 3) might gain entry into the client networked system 102 and how all of the components 112, 114, 116 are connected for reachability by an attacker 302. A risk evaluation specific to the client networked system 102 may then be performed based on the constructed network topology.

A client's security objectives/requirements are analyzed at step 202 because the security requirements of a specific client may differ according to the value of their computing assets outsourced to the cloud computing network. Thus, the client's security objectives must be understood to properly value the components 112, 114, 116 in the client networked system 102 (e.g., weighting values 122, 124, 126, 128) and provide a security risk evaluation tailored to the client. A client's security objectives may change based on their field of business, their system topology, and/or their system size, among other factors. In some embodiments, a client may provide their own specific security requirements. In other embodiments, a security administrator may choose different security requirements based on a type of client.

Once the components 112, 114, 116 are identified, the threats 132, 134, 136, 138 posed to each component 112, 114, 116 are then identified (step 204). It should be appreciated that a component 112, 114, 116 may have zero, one, or any number of threats 132, 134, 136, 138. In various embodiments, a threat categorization model 130 may be used to identify the threats 132, 134, 136, 138. For example, the STRIDE threat modeling framework from Microsoft, Inc. may be used to evaluate the risk associated with each threat category in the model. The STRIDE model categorizes threats into one of six categories: Spoofing, Tampering, Repudiation, Information Disclosure, Denial-of-Service, and Elevation of Privilege. It should be appreciated, however, that there are many ways of specifying threats and a threat categorization model 130 is used primarily to categorize the nature of threats 132, 134, 146, 138. Therefore, any suitable threat categorization model 130 capable of accomplishing that purpose may be used. In some embodiments, zero-day vulnerabilities are also considered when identifying threats 132, 134, 136, 136. In such embodiments, example method 200 includes zero-day vulnerability assessment methods. For example, zero-day vulnerability assessment methods may include the k-zero-day safety method, what-if-based zero-day vulnerability assessments, or other assessment methods.

After every threat 132, 134, 136, 138 is identified for each component 112, 114, 116, a weighting value 122, 124, 126, 128 is assigned to every threat 132, 134, 136, 138 for a given component 112, 114, 116 (step 206). For example, a weighting value 122 may be assigned to a threat 132 for a component 112 and a weighting value 124 may be assigned to a threat 134 for the component 112. In some embodiments, the weighting values 122, 124, 126, 128 may be based on the function or importance of the component 112, 114, 116 or on the client's security objectives (e.g., depending on the function performed, a component may be more susceptible to some class of threats as compared to others). For example, a VM that acts as a Web Server in a medical records management application could be assigned the highest weighting value 122, 124, 126, 128 for Denial-of-Service threats 132, 134, 136, 138 because if such attacks are successfully launched, then the rest of the VM's that are reached through the Web Server would be unavailable. On the other hand, a vulnerability 142, 144 discovered in a VM hosting a database of medical records may be assigned the highest weighting value 122, 124, 126, 128 for Information Disclosure threats 132, 134, 136, 138 because if it is compromised, confidentiality of patients' medical history would be violated.

In some embodiments, the weighting values 122, 124, 126, 128 may be provided by the client. In some embodiments, the weighting values 122, 124, 126, 128 may be derived automatically based on the client's security requirements. In other embodiments, the security vendor may systematically determine the weighting values 122, 124, 126, 128 based on the client's security requirements through manual analysis. In some embodiments, threats 132, 134, 136, 138 of a certain type are treated as posing the same type of risk when assigning weighting values 122, 124, 126, 128. For example, all Information Disclosure threats 132, 134, 136, 138 may be treated as posing the risk of divulging information. In other embodiments, the purpose behind a threat 132, 134, 136, 138 may be considered in the risk the threat 132, 134, 136, 138 poses when assigning weighting values 122, 124, 126, 128. For example, an attacker may compromise the confidentiality of a medical record to steal social security numbers for impersonating the legitimate medical insurance policy holders. Another attacker may target medical records of celebrity patients to publicize their ailments and ruin their reputation. In the first instance, the attacker's purpose is to compromise the confidentiality for financial gain through a fraud. In the second instance, the attacker's purpose is to damage the celebrities' reputations. Both instances illustrate an Information Disclosure threat 132, 134, 136, 138 and violate confidentially, but the purposes and types of victims are different and thus the risks posed may be different.

In at least one embodiment, each weighting value 122, 124, 126, 128 is a value between 0 and 1 and the sum of the weighting values 122, 124, 126, 128 for a given component 112, 114, 116 equals 1. For example, a component 112 may be found to have threats 132, 134, and 136. Threat 132 may be most important and have a weighting value 122 of 0.5, threat 134 may be next most important with a weighting value 124 of 0.3, and threat 136 may be least important with a weighting value 126 of 0.2. It should be appreciated that any suitable weighting method may be used to distinguish the relative importance of different components 112, 114, 116 with respect to a threat 132, 134, 136, 138.

In the example method 200, vulnerabilities 142, 144 and their respective impact values 150, 152 and exploitability values 154, 156 may then be identified for each component 112, 114, 116 (step 208). A component 112, 114, 116 may have one or more vulnerabilities 142, 144. A component 112, 114, 116 may also not have a vulnerability 142, 144. In the example method 200, an exploitability value 154, 156 is a measure of the probability that a vulnerability 142, 144 can be successfully exploited by an attacker. Conversely, a failure to exploit value is the probability that an attacker will fail to exploit a vulnerability 142, 144. An impact value 150, 152 is a measure of the amount of loss or damage to an asset that would occur if the vulnerability 142, 144 is successfully exploited. It should be appreciated that vulnerabilities 142, 144 of a given component 112, 114, 116 may be discovered a number of ways, such as a database of known vulnerabilities 142, 144. For example, in at least one embodiment, the Common Vulnerability Scoring System may be used to identify vulnerabilities 142, 144 and their respective impact values 150, 152 and exploitability values 154, 156. In some embodiments, each component 112, 114, 116 may have an overall impact value that is the sum of the impact values 150, 152 of all its vulnerabilities 142, 144 and may be calculated by Equation 1 below. In some embodiments, each component 112, 114, 116 may have an overall exploitability/probability value that is the sum of the failure to exploit values of each of its vulnerabilities 142, 144 and may be calculated by Equation 2 below.

$$\lambda(\eta i) = \sum_{j=1}^{|V(\eta i)|} \alpha_{vj}, v_j \in V(\eta_i), V(\eta_i) \subseteq \mathbb{V} \qquad \text{Equation 1}$$

$$\mu(\eta i) = 1 - \prod_{j=1}^{|V(\eta i)|} \{1 - \beta_{vj}\}, v_j \in V(\eta_i), V(\eta_i) \subseteq \mathbb{V} \qquad \text{Equation 2}$$

After the vulnerabilities 142, 144 are identified for each component 112, 114, 116, a relevant threat set 162, 164 may be determined for the first vulnerability 142 of the first component 112 from the threats 132, 134, 136, 138 identified in step 204 as described above (step 210). To determine the relevant threat set 162, 164, objective threats may be eliminated from the identified threats 132, 134, 136, 138 (step 212). In other words, threats 132, 134, 136, 138 that cannot be traced to the first vulnerability 142 and thus do not pose a threat to the first component 112 based on the vulnerability 142 may be eliminated. Subjective threats may also be eliminated from the identified threats 132, 134, 136, 138 (step 214). In other words, the identified threats 132, 134, 136, 138 that have a weighting value 122, 124, 126, 128 of zero for the first component 112 may be eliminated because they are not considered important to the client's security requirements. By removing objective and subjective threats as described, the present technology may provide security evaluations tailored to the important threats 132, 134, 136, 138 for a client.

For example, a vulnerability 142 may be found for the component 112 which had four threats 132, 134, 136, 138 identified. The threat 132 may have a weighting value 122 of 0.5, the threat 134 may have a weighting value 124 of 0.25, the threat 136 may have a weighting value 126 of 0.25, and the threat 138 may have a weighting value 128 of 0. The threat 136 could not exploit the vulnerability 142 and therefore could not be traced to it. Thus, the relevant threat set 162 for the vulnerability 142 of the component 112 includes the threat 132 and the threat 134 because the threats 136 and 138 were eliminated objectively and subjectively, respectively. In some embodiments, the relevant threat set 162, 164 may be determined by Equation 3 below.

$$\Gamma(\eta_i) = \Big|^{|V(\eta i)|}_{j=1}\Big| \Big|^{|\gamma_{vj}|}_{t=1}\kappa \leftarrow t,$$

$$\forall t \in \gamma_{vj}, \forall vj \in V(\eta i) \mid \kappa \in 2\Phi$$

Equation 3

According to the example method 200, after a relevant threat set 162, 164 is determined for the first vulnerability 142 of the first component 112, steps 210-214 may be repeated for each vulnerability 142, 144 of the first component 112 (step 216). In other words, a relevant threat set 162, 164 may be determined for each vulnerability 142, 144 of the first component 112. For example, the component 112 from above may also have a vulnerability 144 which had four threats 132, 134, 136, 138 identified. A relevant threat set 164 may be determined for the vulnerability 144 in the same manner as described above. The component risk 170 of the first component 112 may then be calculated using the relevant threat sets 162, 164 for each vulnerability 142, 144 (step 218). In some embodiments, the component risk 170 may be calculated by computing a product of (i.e., multiplying): the overall impact value of the component 112, 114, 116, the overall exploitability/probability value of the component 112, 114, 116, and a sum of the weighting values 122, 124, 126, 128 assigned to each of the threats 132, 134, 136, 138 in the relevant threat sets 162, 164. For example, the component risk 170 of a component 112, 114, 116 may be calculated according to Equation 4 below.

$$\text{Risk}(\eta_i) = \lambda(\eta_i) * \mu(\eta_i) * \sum_{t=1}^{|\Gamma(\eta_i)|} \omega(\eta_i, t),$$

$$\forall t \in \Gamma(\eta_i) \mid \Gamma(\eta_i) \in 2\Phi$$

Equation 4

In some embodiments, a component risk 170 may be calculated based on only a subset of the threats 132, 134, 136, 138 in one or more relevant threat sets 162, 164. For example, a client may be particularly concerned with knowing the risk that only one or two threats 132, 134, 136, 138 pose to a component 112, 114, 116. Accordingly, a component risk 170 based on a subset of threats 132, 134, 136, 138 in one or more relevant threat sets 162, 164 may be calculated by $$\text{Risk}(\eta_i, \kappa) = \lambda(\eta_i) * \mu(\eta_i) * \sum_{t=1}^{|\kappa|} \omega(\eta_i, t),$$

$$\forall t \in \kappa \mid \kappa \subseteq \Gamma(\eta_i) \Rightarrow \kappa \in 2\Phi$$

Equation 5

In some embodiments, steps 210-218 may then be repeated for each of the components 112, 114, 116 in the client networked system 102 to calculate a component risk 170 for each of the components 112, 114, 116 (step 220). In some embodiments of method 200, a client may only be concerned with the component risk 170 of one or more components 112, 114, 116 and thus method 200 proceeds to selecting optimal countermeasures from a pool of different applicable countermeasures to mitigate the component risk 170 of one or more components 112, 114, 116 (step 228). For example, countermeasures may include patching a vulnerability, isolating a host based on host risk to deactivate the host with the highest risk value associated with it, isolating a host based on the network topology to deactivate the host with the highest degree of certainty, and other suitable countermeasures. In some embodiments of method 200, a client may be concerned with calculating the risk posed to a path (step 222), the risk posed to a subsystem (step 224), or the risk posed to the networked system as a whole (step 226) prior to selecting proper countermeasures in step 228. Computing the path risk 172, the subsystem 174, and the system risk 176 will be discussed in more detail in the next section.

In some embodiments, the method 200 may be repeated to compute the threat-specific risk 180 of a client networked system 102 whenever there are changes in the cloud computing environment. In other embodiments, the method 200 may include steps for automatically updating a threat-specific risk 180 as the cloud computing environment changes, for example, by utilizing a temporal-based modeling technique. A temporal-based modeling technique may be useful for a cloud provider to examine the present technology's performance with respect to different threats 132, 134, 136, 138 over a period of time. For example, the security risk for all snapshots collected in a specific period (e.g., 1 week, 1 month, etc.) can be computed for statistical analysis of the security risk over time.

Path, Subsystem, and System Risk Embodiment

Figure 3:
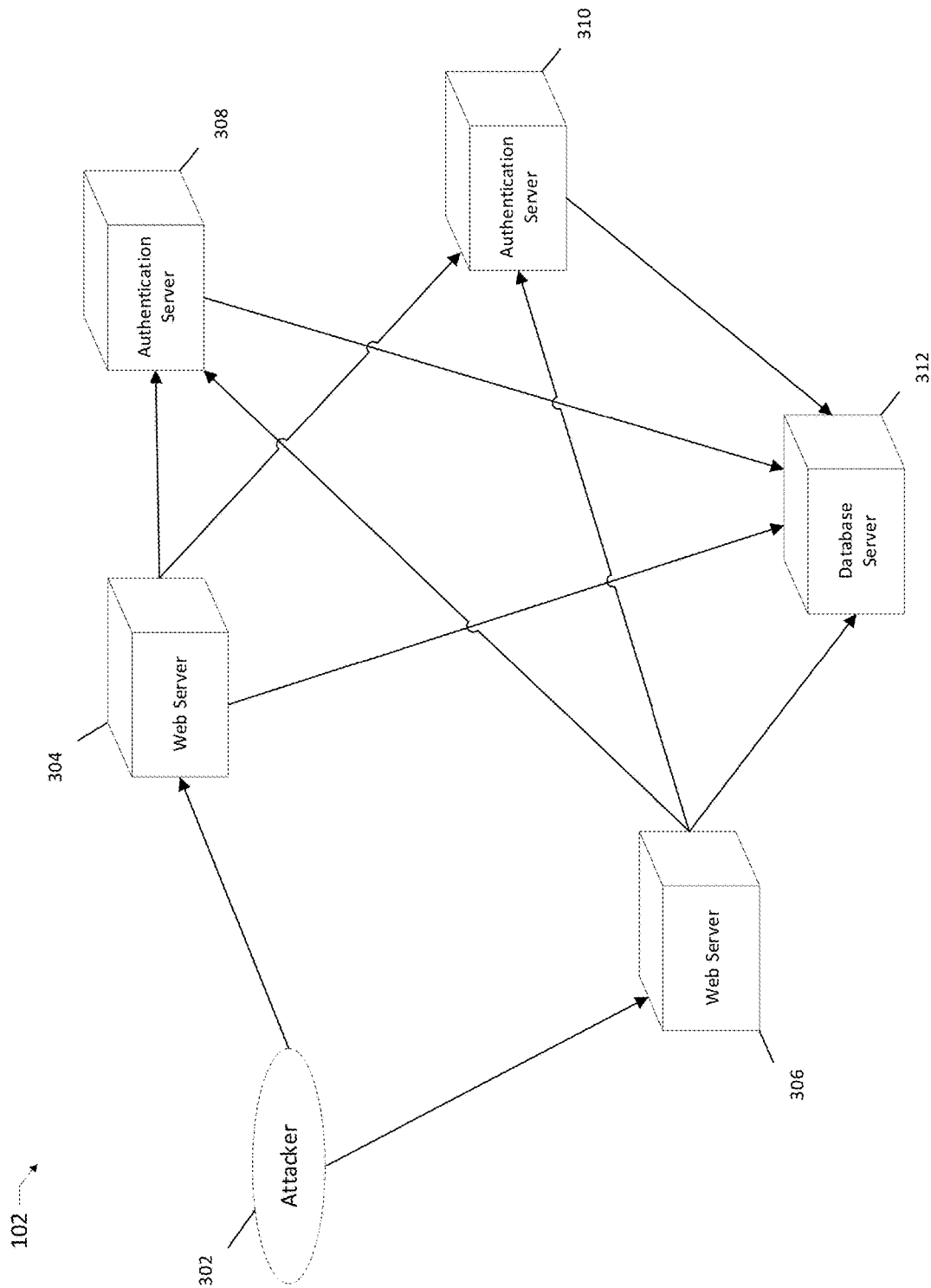
FIG. 3 illustrates an example embodiment of a topology of a networked system and example paths an attacker may take to reach an asset according to the present disclosure.

As mentioned above, in an embodiment, the present technology may compute a path risk 172, a subsystem risk 174, and/or a system risk 176 of the client networked system 102. FIG. 3 illustrates an attacker 302 performing an attack on an example client networked system 102 which includes five VM components 112, 114, 116: two web servers 304 and 306, two authentication servers 308 and 310, and a database server 312.

An attacker 302 may take different attack paths from a given entry point component 112, 114, 116 to reach a target component 112, 114, 116. The target component 112, 114, 116 contains the asset that the attacker 302 intends to harm, such as a VM hosting a database of medical records. An entry point component 112, 114, 116 is the first component 112, 114, 116 in the networked system 102 that an attacker 302 attempts to compromise to reach the target. For example, an entry point component 112, 114, 116 may be a web server connected to a public network which is reachable by the attacker 302. A path risk 172 may thus be the risk that an attacker 302 may launch a successful attack on a component 112, 114, 116 using a particular path. For example, to attack database server 312, the attacker 302 may take a path from an entry point at the web server 304 to the authentication server 308 to the database server 312. Or, in another example, the attacker may take a path from an entry point at the web server 306 to the database server 312.

The probability of launching a successful attack on a particular path depends on the vulnerabilities 142, 144 in each of the components 112, 114, 116 that need to be compromised along that path in order to reach the target, and the probabilities of exploiting all of them. That is, in some embodiments, the probability of success (i.e., exploitability of a path) may be determined by the exploitability values 154, 156 of the vulnerabilities 142, 144 of all the components 112, 114, 116 in the particular path, including the target. This also expresses the reachability of the target component 11, 114, 116. In some embodiments, as an attacker 302 advances through a path, each successful compromise of a component 112, 114, 116 constitutes a risk of that component 112, 114, 116. Thus, in such embodiments, the path risk 172 for all relevant threats 132, 134, 136, 138 is a sum of all the component risks 170 of each component 112, 114, 116 in the path and may be calculated by Equation 6 below. The path risk 172 may also be calculated from a subset of threats 132, 134, 136, 138 in one or more relevant threat sets 162, 164, for example, from Equation 7 below.

$$\mathrm{Risk}(Path_l) = \sum_{i=1}^{|\chi l|} \mathrm{Risk}(\eta_i), \forall \eta_i \in \chi l \mid \chi l \subseteq \mathbb{N} \quad \text{Equation 6}$$

$$\mathrm{Risk}(Path_l, \kappa) = \sum_{i=1}^{|\chi l|} \mathrm{Risk}(\eta_i, \kappa), \quad \text{Equation 7}$$

$$\forall \eta_i \in \chi l \mid \chi l \subseteq \mathbb{N}, \kappa \in 2^\Phi$$

A system risk 176 includes the evaluation of risk of all the components 112, 114, 116 in the entire client networked system 102. In other words, the risk that the attacker 302 is able to compromise the entire client networked system 102. An example system risk 176 would be the risk that the attacker 302 poses to the web servers 304 and 306, the two authentication servers 308 and 310, and the database server 312 as a whole. In various embodiments, the system risk 176 may be calculated from a sum of the component risks 170 of each of the components 112, 114, 116 that make up the client networked system 102. For example, the system risk 176 may be calculated from Equation 8 below. In some embodiments, the system risk 176 may also be calculated from a subset of threats 132, 134, 136, 138 in one or more relevant threat sets 162, 164, for example, from Equation 9 below.

$$\mathrm{Risk}(\Omega) = \sum_{i=1}^{|\mathbb{N}|} \mathrm{Risk}(\eta_i), \forall \eta_i \in \mathbb{N} \quad \text{Equation 8}$$

$$\mathrm{Risk}(\Omega, \kappa) = \sum_{i=1}^{|\mathbb{N}|} \mathrm{Risk}(\eta_i, \kappa), \forall \eta_i \in \mathbb{N}, \kappa \in 2^\Phi \quad \text{Equation 9}$$

Figure 4:
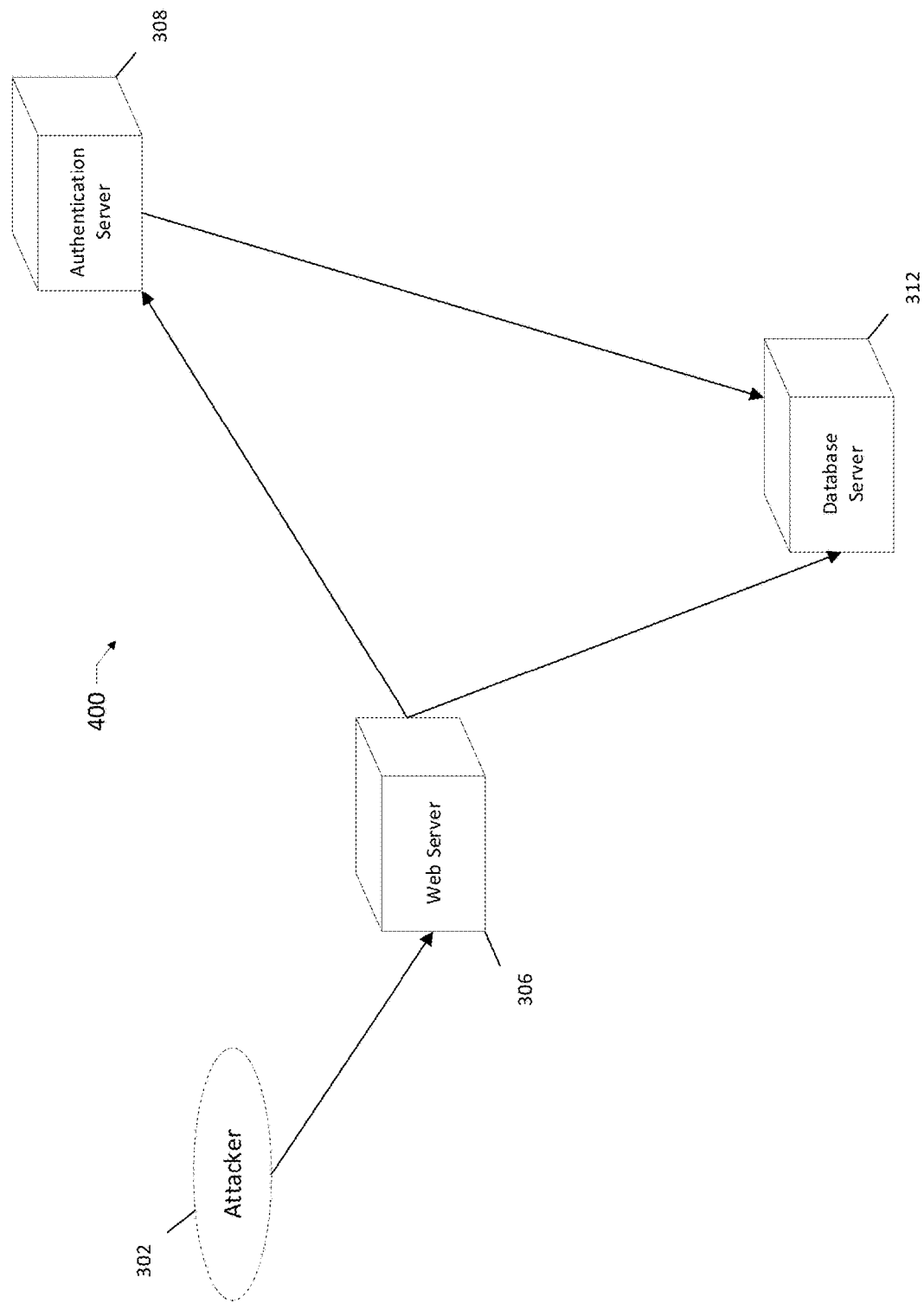
FIG. 4 illustrates an example embodiment of a subsystem of a networked system according to the present disclosure.

A subsystem risk 174 includes the evaluation of the risk of a subsystem comprising one or more components 112, 114, 116 that are grouped together because of their contribution to the performance of a particular function or delivery of a given service in the client networked system 102. For example, a group of VMs that are involved in the deployment of an Enterprise Resource Planning application for managing hospital staff data for the human resource department may be a subsystem. FIG. 4 illustrates an example subsystem 400 of the client networked system 102 in FIG. 3, wherein the example subsystem 400 includes the web server 306, the authentication server 308, and the database server 312. In various embodiments, the subsystem risk 174 may be calculated from a sum of the component risks 170 of each of the web server 306, the authentication server 308, and the database server 312 that make up the subsystem 400. For example, the subsystem risk 174 may be calculated from Equation 10 below. In some embodiments, the subsystem risk 174 may also be calculated from a subset of threats 132, 134, 136, 138 in one or more relevant threat sets 162, 164, for example, from Equation 11 below.

$$\mathrm{Risk}(N_k) = \sum_{i=1}^{|\Theta_\kappa|} \mathrm{Risk}(\eta_i), \forall \eta_i \in \Theta_\kappa \mid \Theta_\kappa \subseteq \mathbb{N} \quad \text{Equation 10}$$

$$\mathrm{Risk}(N_k, \kappa) = \sum_{i=1}^{|\Theta_\kappa|} \mathrm{Risk}(\eta_i), \quad \text{Equation 11}$$

$$\forall \eta_i \in \Theta_\kappa \mid \Theta_\kappa \subseteq \mathbb{N}, \kappa \in 2^\Phi$$

Risk Evaluation Software Tool Embodiment

In various embodiments, the present technology may include a risk evaluation software tool 510 (FIG. 5) that supports security administrators in performing risk evaluations. In at least one embodiment, the risk evaluation software tool 510 automates the client networked system 102 topology modeling, the vulnerability 142, 144 data collection for each component 112, 114, 116 in the networked system 102, and the threat-specific risk 180 computation. In various embodiments, such as the embodiment illustrated in FIG. 5 and described below, the network topology modeling and the risk computation features are implemented in Java. It should be appreciated, however, that any suitable programming language or software program may be used. The risk evaluation software tool 510 may be integrated with a vulnerability database 502 (FIG. 5) that informs the risk evaluation software tool 510 on the most up-to-date, known vulnerabilities 142, 144 along with their respective impact values 150, 152, their respective exploitability values 154, 156, and the threats 132, 134, 136, 138 posed by each vulnerability 142, 144.

Figure 5:
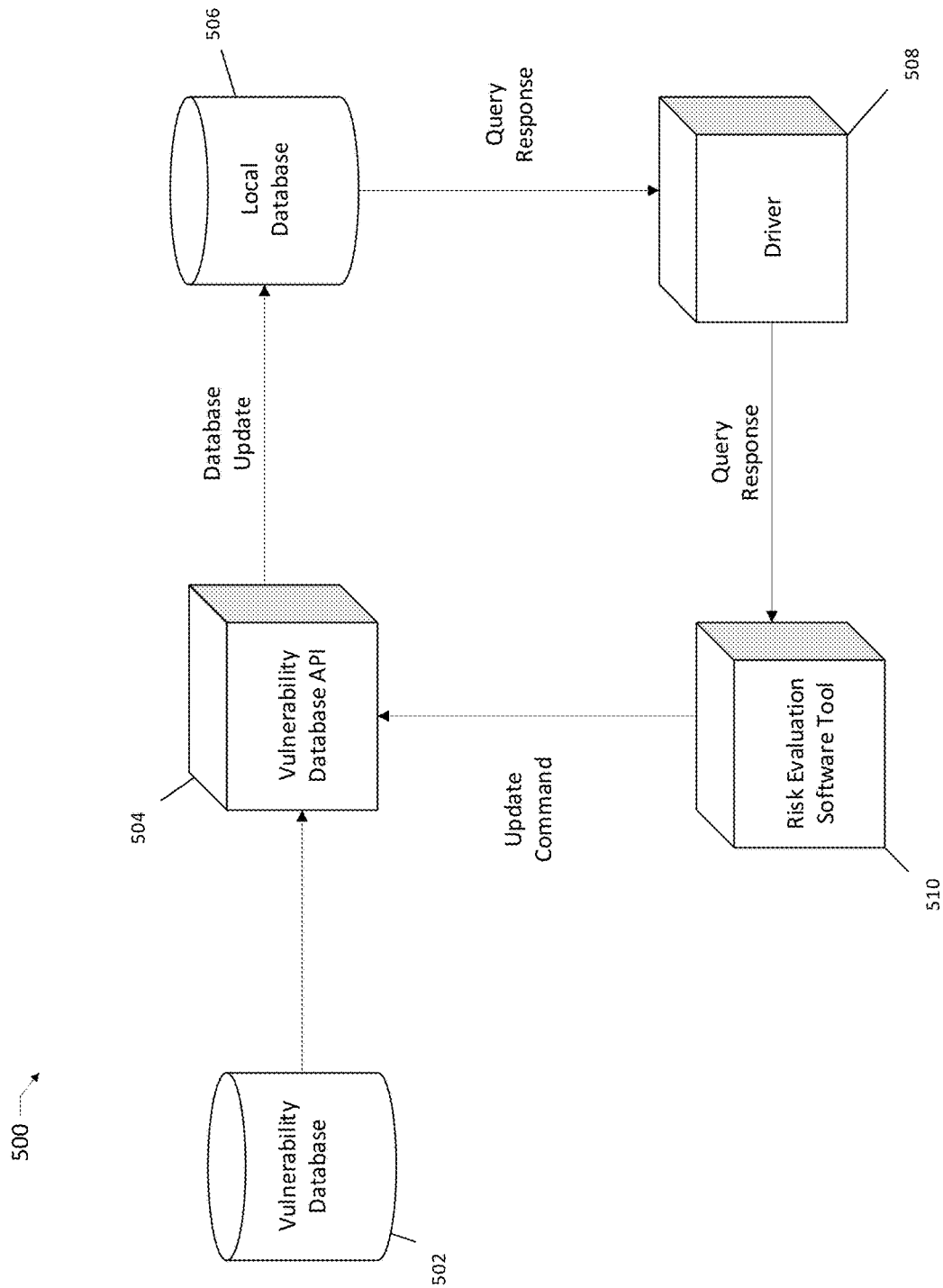
FIG. 5 illustrates an example embodiment of architecture for integrating a vulnerability database through an API into a software tool according to the present disclosure.

FIG. 5 illustrates an example architecture 500 for integrating a vulnerability database API 504 into the risk evaluation software tool 510, according to an example embodiment of the present disclosure. The vulnerability database API 504 may access a list of vulnerabilities from a vulnerability database 502. For example, the vulnerability database 502 may be the National Vulnerability Database (e.g., https://nvd.nist.gov/) which is continually updated. The vulnerability database API 504 may then create a local database 506 for storing the vulnerability information. For example, the local database 506 may be a MongoDB® database in at least one embodiment. In the illustrated embodiment, the risk evaluation software tool 510 connects to the local database 506 via a driver 508. The driver 508 enables the risk computation feature of the risk evaluation software tool 510 to query the local database 506 containing the vulnerability 142, 144 information. In some embodiments, the risk evaluation software tool 510 may communicate an update command to the vulnerability database API 504 causing the vulnerability database API 504 to access the latest vulnerability 142, 144 information from the vulnerability database 502 and update the local database 506.

Figure 6:
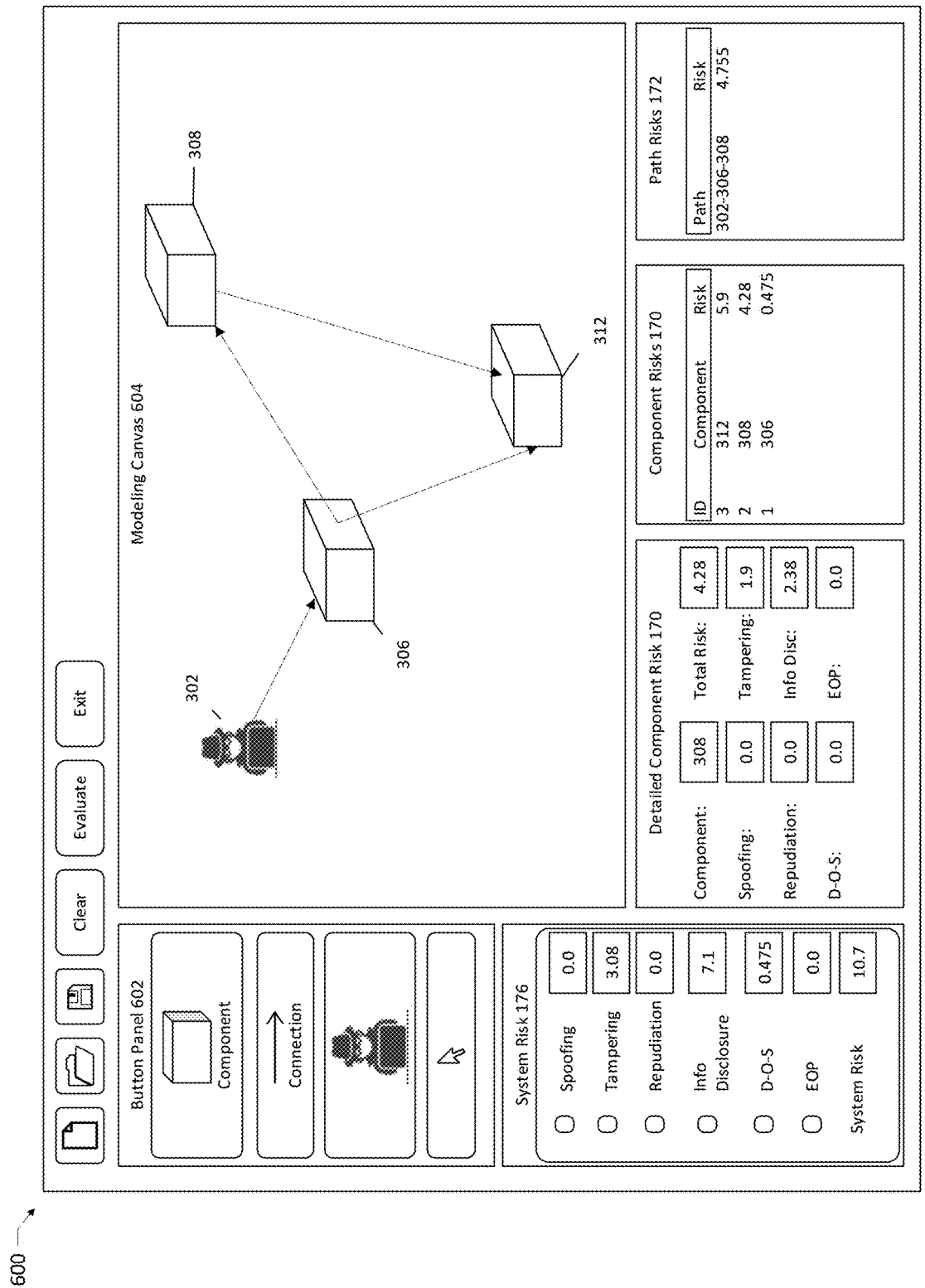
FIG. 6 illustrates an example embodiment of a screen of a user interface for a software tool according to the present disclosure.

FIG. 6 illustrates an example screen 600 of the user interface for the risk evaluation software tool 510, according to an example embodiment of the present disclosure. The example screen 600 includes a button panel 602 including a button to add a component 112, 114, 116, a button to add a connection, or edge, between components 112, 114, 116, a button to add an attacker 302, and a cursor button to activate the cursor and edit the network model. The example screen 600 also includes a modeling canvas 604 on which components 112, 114, 116, connections, and attackers 302 may be arranged to model a client networked system 102 and potential attacks against it. In the illustrated embodiment, the example screen 600 shows topology modeling of the subsystem 400 illustrated in FIG. 4 on the modeling canvas 604. It should be appreciated, however, that any arrangement of components 112, 114, 116, connections, and attackers 302 may be modeled on the modeling canvas 604 to represent a client networked system 102.

Figure 7:
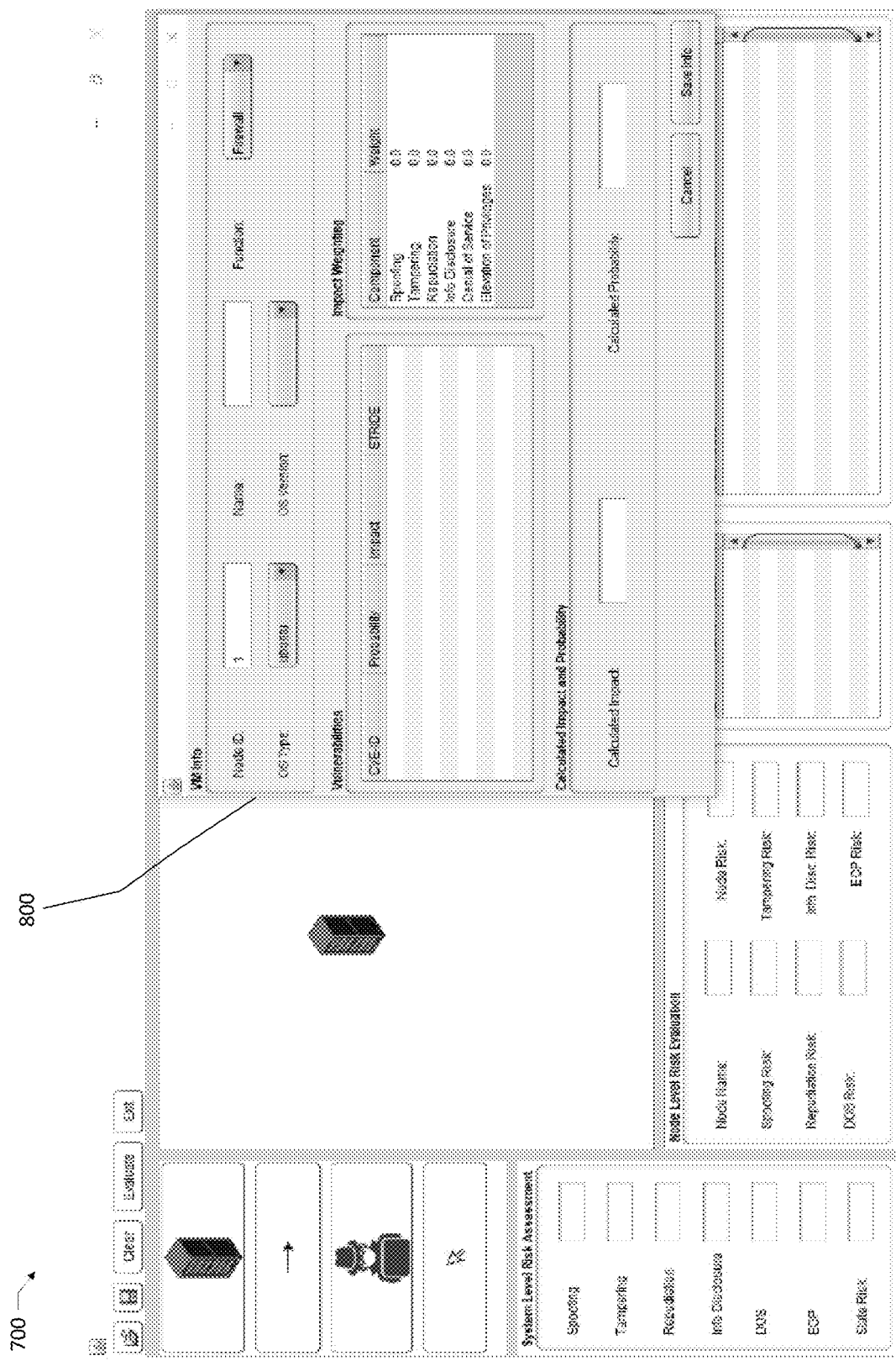
FIG. 7 illustrates an example embodiment of a screen of a user interface of a software tool for adding a component to a networked system model according to the present disclosure.
Figure 8:
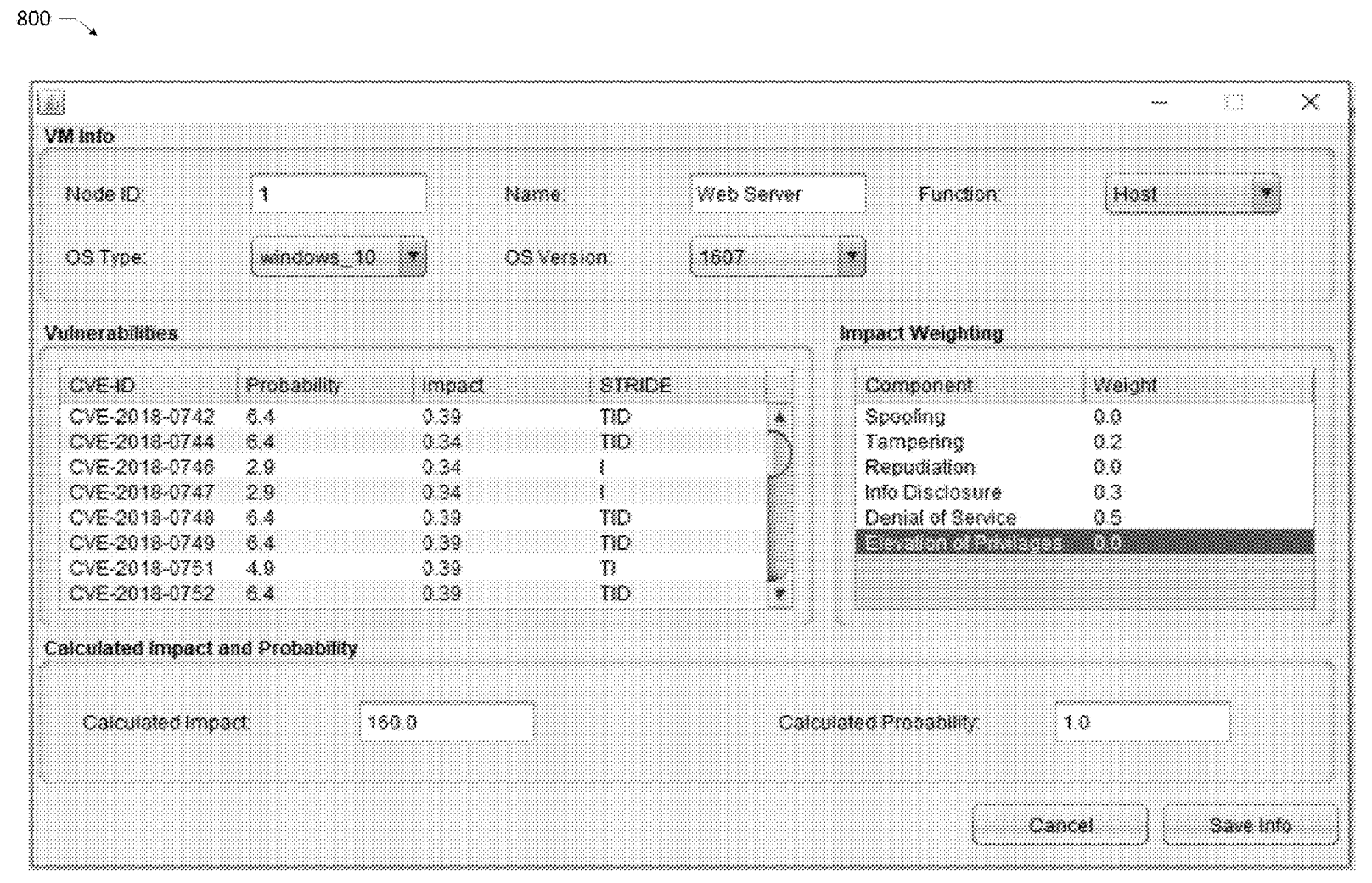

FIG. 7 illustrates an example embodiment of a screen 700 of the user interface for the risk evaluation software tool 510 when a component 112, 114, 116 is added to the modeling canvas 604. In an embodiment, when a component 112, 114, 116 is added to the modeling canvas 604, an example component information screen 800 appears for the security administrator to input information about the component 112, 114, 116. FIG. 8 illustrates a magnified view of an example component information screen 800, according to an embodiment. In the illustrated embodiment, the example component information screen 800 includes fields to input a name, a function, an operating system (OS) type, and an OS version for the component 112, 114, 116 to be added. In some embodiments, an ID may also be automatically generated for the component 112, 114, 116. For example, in FIG. 8 the name input is Web Server, the function is as a Host, the OS type is Windows 10, the OS version is 1607, and the ID generated is 1. It should be appreciated that the component information screen 800 may include more or less information about a component 112, 114, 116 and may be arranged in any suitable format.

In some embodiments, once the requested information is input on the example component information screen 800, the risk evaluation software tool 510 will query the local database 506 to obtain information on the vulnerabilities 142, 144 for the component 112, 114, 116, and will automatically populate the information on the component information screen 800. In some embodiments, the vulnerabilities 142, 144 will be based on the OS type and OS version of the component 112, 114, 116. This information on the vulnerabilities 142, 144 may include the respective impact values 150, 152, exploitability values 154, 156, and threats 132, 134, 136, 138 posed for each vulnerability 142, 144, as is the case in the illustrated embodiment. It should be appreciated that the information on the vulnerabilities 142, 144 may include more or less suitable information. In other embodiments, this information may be entered manually for each added component 112, 114, 116.

In some embodiments, the component information screen 800 may also include a section for a security administrator to input the weighting values 122, 124, 126, 128 for each threat 132, 134, 136, 138 posed to the component 112, 114, 116 to be added. In some embodiments, the risk evaluation software tool 510 may calculate an overall impact value and overall exploitability/probability value for the component 112, 114, 116 to be added, which may be displayed on the example component information screen 800. In various embodiments, the component information screen 800 includes a save button that a security administrator may press to add the component 112, 114, 116 to the modeling canvas 604 and a cancel button to abandon adding the component 112, 14, 116.

Returning to FIG. 6, the example screen 600 in an embodiment may include a button (e.g., an "evaluate" button) that a security administrator may press to initiate the risk evaluation for the system modeled on the modeling canvas 604. The example screen 600 in various embodiments, as illustrated for example, includes a section for the system risk 176 of the modeled client networked system 102, including the system risk 176 for each type of threat 132, 134, 136, 138 and the system risk 176 when considering all threats 132, 134, 136, 138. The example screen 600 may also include a section for the detailed component risk 170 of a selected component 112, 114, 116, including the component risk 170 for each type of threat 132, 134, 136, 138 and the total component risk 170 when considering all threats 132, 134, 136, 138. For example, in the illustrated embodiment, the authentication server 308 is the selected component 112, 114, 116. The example screen 600 may also include a section for the component risk 170 of each component 112, 114, 116 in the modeled client networked system 102. In one embodiment, the components 112, 114, 116 are listed in order of the amount of component risk 170 with the component 112, 114, 116 with the greatest amount of component risk 170 at the top. For example, in the illustrated embodiment, the component risk 170 for each of the web server 306, the authentication server 308, and the database server 312 are shown in order of the amount of component risk 170.

The example screen 600 may also include a section for all of the possible path risks 172 for a selected component 112, 114, 116. For example, in the illustrated embodiment, because the authentication server 308 is the selected component 112, 114, 116 as stated above, the path risk 172 is shown of the only possible path an attacker 302 could take to reach the authentication server 308 (i.e., 302-306-308). An attacker 302 could not reach the authentication server 308 through the database server 312 in the illustrated embodiment because, as indicated by the model, there is not a connection from the database server 312 to the authentication server 308. It should be appreciated that example screen 600 is merely for illustrative purposes and the user interface for the risk evaluation software tool 510 may take any suitable form and present more or less information.

Figure 9:
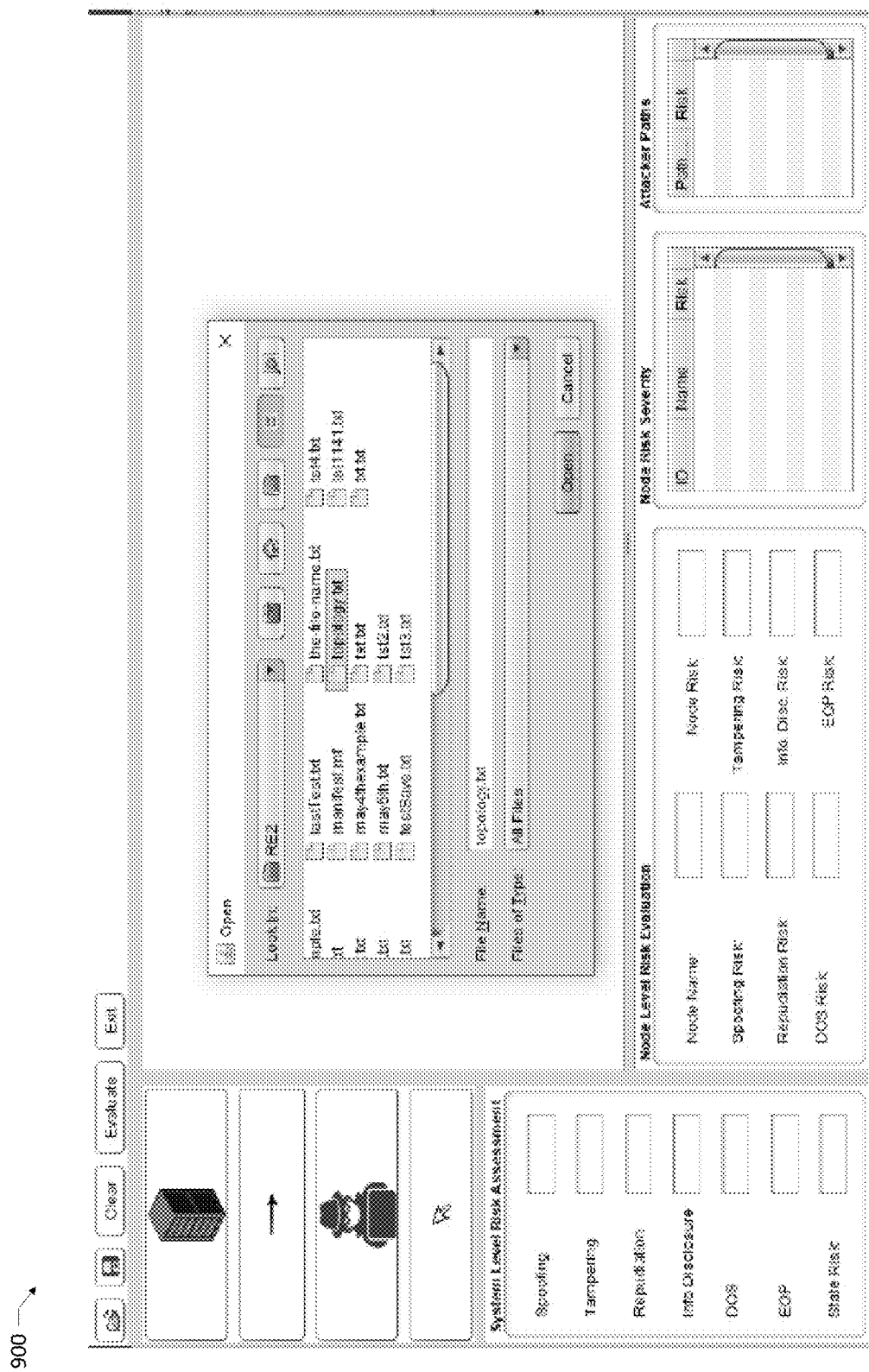
FIG. 9 illustrates an example embodiment of a screen of a user interface of a software tool for opening a saved network topology according to the present disclosure.

In some embodiments, the risk evaluation software tool 510 may enable a security administrator to save network topology models for future use. In such embodiments, the risk evaluation software tool 510 may also enable a security administrator to open a saved network topology model. FIG. 9 illustrates an example screen 900 of the user interface for the risk evaluation software tool 510 for a security administrator to open a saved network topology model. As noted prior, it should again be appreciated that FIGS. 6-9 and the accompanying description of user interfaces for the risk evaluation software tool 510 are merely a single illustrated embodiment of the present disclosure and any suitable user interface may be used to accomplish the described purpose of the risk evaluation software tool 510.

Experimental Validation of Threat-Specific Risk Computation

FIG. 10 illustrates an example SaaS cloud system 1000 for a patient medical records management application used by a hospital. The example SaaS cloud system 1000 is an example client networked system 102 used as an example implementation and validation of the present technology. The modeled topology of the SaaS cloud system 1000 includes a host 1010 of web servers 304 and 306, a host 1012 of authentication servers 308 and 310, and a host 1014 of a database server 312. The authentication servers 308 and 310 may access a user information database 1006 that stores information for authentication, such as usernames and passwords in one embodiment. The database server 312 may access a medical records database 1008 that stores patient medical records.

Users 1002 (e.g., doctors and patients in the current example) access the SaaS cloud system 1000 through a firewall 1004. If authentication is not required, the host 1010 may send an access request directly to the database server 312 to access patient medical records in the medical records database 1008. For example, setting or viewing an appointment may not require authentication in an embodiment. If authentication is required, the host 1010 may send an access request through the host 1012 for authentication before allowing access to the records database. For example, viewing or updating patients' records may require authentication in an embodiment. Thus, the sensitivity of the data may dictate whether authentication is required or not. As illustrated, an attacker 302 may attempt to compromise the SaaS cloud system 1000 through the firewall 1004.

Table 2 below shows the configuration details of the components 112, 114, 116 of the SaaS cloud system 1000 including operating systems ("OS") and their known associated vulnerabilities 142, 144. The base score, impact a, probability of successful exploitation f, and types of threats posed g are listed in order for each vulnerability 142, 144. The STRIDE threat modeling framework was used for the types of threats posed. The Common Vulnerability Scoring System was used for the vulnerabilities 142, 144 and only the vulnerability 142, 144 attributes needed for risk computations are shown. Table 3 below shows the weighting values 122, 124, 126, 128 of the identified threats 132, 134, 136, 138 for each component.

highest impact because it would block access to the medical records. The Spoofing threat 132, 134, 136, 138 was also important because an access request directed to the hospital would have been diverted to an illegitimate source, which may have produced fake or misleading records to the users 1002 and could have potentially harmed the hospital's reputation. The other threat categories were assigned a weighting value 122, 124, 126, 128 of zero because the client was not concerned with those threat categories for the web server components 112, 114, 116. Even though web servers 304 and 306 performed the same functions, they were each assigned weighting values 122, 124, 126, 128 because they had different sets of vulnerabilities 142, 144. Thus, while web servers 304 and 306 had identical weighting values 122, 124, 126, 128 in this example, in some embodiments they may have different weighting values 122, 124, 126, 128 for certain threats 132, 134, 136, 138 because their respective vulnerabilities 142, 144 are susceptible to different threats 132, 134, 136, 138.

The threat 132, 134, 136, 138 that had the highest impact on the authentication servers 308 and 310 was an Escalation of Privilege attack. However, if the credentials stored in the server were lost or stolen, then attackers 302 may have gained unauthorized access to the medical records, and thus Information Disclosure threats 132, 134, 136, 138 were important as well. The client in this example additionally considered Spoofing and Tampering threats 132, 134, 136, 138 to be relevant. In this example, the authentication server 308 was assigned the weighting values 122, 124, 126, 128 of 0.05 for Spoofing, 0.20 for Tampering, 0.25 for Information Disclosure and 0.50 for Elevation of Privilege.

Confidentiality was the most important security objective for the database server 312. If the database server 312 was compromised, an attacker 302 could have stolen sensitive medical records. Therefore, in this example, the hospital

TABLE 2

| | | | VULNERABILITIES | | | |
|---|---|---|---|---|---|---|
| Component | OS | CVE-ID | Base Score | α (Imp.) | β (Prob.) | g (Threats) |
| 304 | WIN10 | CVE-2017-0280 | 5.9 | 3.6 | 0.22 | D |
| 308 | WIN10 | CVE-2017-0280 | 5.9 | 3.6 | 0.22 | D |
| | | CVE-2017-0246 | 7.0 | 5.9 | 1.00 | T, I, D |
| 312 | RHEL | CVE-2017-1000376 | 7.0 | 5.9 | 1.00 | T, I, D |
| 306 | Linux | CVE-2017-10810 | 7.5 | 3.6 | 0.39 | D |
| 310 | Linux | CVE-2017-1297 | 7.3 | 5.9 | 0.13 | T, I, D |

TABLE 3

| | w($n_i$, t) | | | | | |
|---|---|---|---|---|---|---|
| Component | S | T | R | I | D | E |
| 304 | 0.40 | 0.00 | 0.00 | 0.00 | 0.60 | 0.00 |
| 308 | 0.05 | 0.20 | 0.00 | 0.25 | 0.00 | 0.50 |
| 312 | 0.00 | 0.20 | 0.00 | 0.80 | 0.00 | 0.00 |
| 306 | 0.40 | 0.00 | 0.00 | 0.00 | 0.60 | 0.00 |
| 310 | 0.05 | 0.20 | 0.00 | 0.25 | 0.00 | 0.50 |

The functions performed by each component 112, 114, 116 determine the threat impact weighting. In this example, the weighting value 122, 124, 126, 128 of threats 132, 134, 136, 138 for web server 304 was 0.40 for Spoofing, 0.60 for Denial-of-Service, and the rest were assigned zero. The rationale for the assignment was that because the web server 304 was a web server component 112, 114, 116, then a Denial-of-Service threat 132, 134, 136, 138 would have the cared about two threats 132, 134, 136, 138: Tampering and Information Disclosure, which were assigned weighting values 122, 124, 126, 128 of 0.20 and 0.80, respectively. This example illustrates the benefits of the threat-specific approach. Tampering with the medical records could have led to wrong prescriptions for patients, and an Information Disclosure attack could have allowed attackers to learn about patients' sensitive medical history. The client, in this example, chose to put more importance on the Information Disclosure threat 132, 134, 136, 138 than the Tampering threat 132, 134, 136, 138 because it found the impact of disclosing sensitive patient records to be greater than potential wrong prescriptions. A generic, asset-based risk evaluation approach could not have much such a distinction when evaluating the risk of the example SaaS cloud system 1000.

Using Equations 1-11, the impact, exploitability, risk for STRIDE threats, and overall component risk 170 for each component 112, 114, 116 (i.e., web servers 304, 306, authentication servers 308, 310, and database server 312) were calculated. Detailed examples of the computations for the authentication server 308 are shown in Equations 12-20 below. Equation 12 is an example computation of the overall impact value for the authentication server 308 which has vulnerabilities $V_1$ and $V_2$. Equation 13 is an example computation of the overall exploitability value of the authentication server 308. Equation 14 is an example computation of the risk of the authentication server 308 with regard to Spoofing threats 132, 134, 136, 138. Equation 15 is an example computation of the risk of the authentication server 308 with regard to Tampering threats 132, 134, 136, 138. Equation 16 is an example computation of the risk of the authentication server 308 with regard to Repudiation threats 132, 134, 136, 138. Equation 17 is an example computation of the risk of the authentication server 308 with regard to Information Disclosure threats 132, 134, 136, 138. Equation 18 is an example computation of the risk of the authentication server 308 with regard to Denial-of-Service threats 132, 134, 136, 138. Equation 19 is an example computation of the risk of the authentication server 308 with regard to Escala- $$\mathrm{Risk}(VM_2,D)=\lambda(VM_2)*\mu(VM_2)*\omega(VM_2,D)=9.50*1.00*0.00=0.00 \qquad \text{Equation 18}$$

$$\mathrm{Risk}(VM_2,E)=\lambda(VM_2)*\mu(VM_2)*\omega(VM_2,E)=9.50*1.00*0.50=4.75 \qquad \text{Equation 19}$$

$$\mathrm{Risk}(VM_2)=\mathrm{Risk}(VM_1,S)+\mathrm{Risk}(VM_1,T)+\mathrm{Risk}(VM_1,I)+\mathrm{Risk}(VM_1,E)=0.48+1.90+2.38+4.75=9.50 \qquad \text{Equation 20}$$

Table 4 below shows both the overall component risks 170 and the risks with respect to every threat 132, 134, 136, 138 for each component 112, 114, 116, calculated by including the irrelevant threats 132, 134, 136, 138 and based on each component's 112, 114, 116 impact value 150, 152 ($\lambda$) and exploitability value 154, 156 ($\mu$). Table 5 below shows the risks calculated when only considering the relevant threat sets 162, 164 for each component 112, 114, 116. For example, the Spoofing and Escalation of Privilege threats 132, 134, 136, 138 were objectively eliminated from the relevant threat set 162, 164 because none of the vulnerabilities 142, 144 for any of the components 112, 114, 116 posed a Spoofing or Escalation of Privilege threat 132, 134, 136, 138.

TABLE 4

| Component | $\lambda$ ($n_i$) | $\mu$ ($n_i$) | Risk($n_i$, k) | | | | | | Risk($n_i$) |
|---|---|---|---|---|---|---|---|---|---|
| | | | S | T | R | I | D | E | |
| 304 | 3.60 | 0.22 | 0.32 | 0.00 | 0.00 | 0.00 | 0.48 | 0.00 | 0.80 |
| 308 | 9.50 | 1.00 | 0.48 | 1.90 | 0.00 | 2.38 | 0.00 | 4.75 | 9.50 |
| 312 | 5.90 | 1.00 | 0.00 | 1.18 | 0.00 | 4.72 | 0.00 | 0.00 | 5.90 |
| 306 | 3.60 | 0.39 | 0.56 | 0.00 | 0.00 | 0.00 | 0.84 | 0.00 | 1.40 |
| 310 | 5.90 | 0.13 | 0.04 | 0.15 | 0.00 | 0.19 | 0.00 | 0.38 | 0.76 |
| System | | | 1.39 | 3.23 | 0.00 | 7.29 | 1.32 | 5.13 | 18.37 |

TABLE 5

| Component | $\lambda$ ($n_i$) | $\mu$ ($n_i$) | Risk($n_i$, k) | | | | | | Risk($n_i$) |
|---|---|---|---|---|---|---|---|---|---|
| | | | S | T | R | I | D | E | |
| 304 | 3.60 | 0.22 | 0.00 | 0.00 | 0.00 | 0.00 | 0.48 | 0.00 | 0.48 |
| 308 | 9.50 | 1.00 | 0.00 | 1.90 | 0.00 | 2.38 | 0.00 | 0.00 | 4.28 |
| 312 | 5.90 | 1.00 | 0.00 | 1.18 | 0.00 | 4.72 | 0.00 | 0.00 | 5.90 |
| 306 | 3.60 | 0.39 | 0.00 | 0.00 | 0.00 | 0.00 | 0.84 | 0.00 | 0.84 |
| 310 | 5.90 | 0.13 | 0.00 | 0.15 | 0.00 | 0.19 | 0.00 | 0.00 | 0.34 |
| System | | | 0.00 | 3.23 | 0.00 | 7.29 | 1.32 | 0.00 | 11.84 | tion of Privilege threats 132, 134, 136, 138. Equation 20 is an example computation of the component risk 170 of the authentication server 308.

$$\lambda(VM_2)=a(V_1)+a(V_2)=3.60+5.9=9.50 \qquad \text{Equation 12}$$

$$\mu(VM_2)=1-(1-\beta(V_1))*(1-\beta(V_2))=1-(1-0.22)*(1-1)=1.00 \qquad \text{Equation 13}$$

$$\mathrm{Risk}(VM_2,S)=\lambda(VM_2)*\beta(VM_2)*\omega(VM_2,S)=9.50*1.00*0.05=0.48 \qquad \text{Equation 14}$$

$$\mathrm{Risk}(VM_2,T)=\lambda(VM_2)*\mu(VM_2)*\omega(VM_2,T)=9.50*1.00*0.20=1.90 \qquad \text{Equation 15}$$

$$\mathrm{Risk}(VM_2,R)=\lambda(VM_2)*\mu(VM_2)*\omega(VM_2,R)=9.50*1.00*0.00=0.00 \qquad \text{Equation 16}$$

$$\mathrm{Risk}(VM_2,I)=\lambda(VM_2)*\mu(VM_2)*\omega(VM_2,I)=9.50*1.00*0.25=2.38 \qquad \text{Equation 17}$$

Using Equation 11 and Table 5, a subsystem risk 174 with respect to Information Disclosure and Denial-of-Service threats 132, 134, 136, 138 was also calculated for the subsystem including the web server 304, the authentication server 308, and the database server 312. Equation 21 below illustrates the example computation. Using Equation 10 and Table 5, a subsystem risk 174 considering all relevant threat sets 162, 164 was calculated for the same subsystem. Equation 22 below illustrates the example computation.

$$\mathrm{Risk}(N1, \{I, D\}) = \mathrm{Risk}(VM1, \{I, D\}) + \mathrm{Risk}(VM2, \{I, D\}) + \mathrm{Risk}(VM3, \{I, D\}) = 7.10 + 0.50 = 7.60 \qquad \text{Equation 21}$$

$$\mathrm{Risk}(N1) = \mathrm{Risk}(VM1) + \mathrm{Risk}(VM2) + \mathrm{Risk}(VM3) = 0.48 + 4.28 + 5.90 = 10.66 \qquad \text{Equation 22}$$

In the above described example simulation, by considering only the relevant threat sets 162, 164, the system risk 176 was reduced from 18.37 to 11.84. This example demonstrated that a generic asset-based approach to risk evaluation may sometimes show an exaggerated risk value, while a threat-specific approach showed a risk value that was representative of the relevant threats 132, 134, 136, 138 posed to the client's example SaaS cloud system 1000.

Experimental Validation of Selecting Optimal Countermeasures

Once the risk of a particular threat (or a set of threats) was known, it was possible to compute the optimal countermeasures/solutions for the selected threat(s). Two types of experiments were conducted to (i) demonstrate the need of threat-specific countermeasure selection and (ii) compare optimal countermeasure selection for different threat-specific scenarios using three different countermeasures (vulnerability patching, host isolation based on host risk, and host isolation based on network topology). For the experiments, the attacker 302 was assumed to be outside the network, and the target was a single host randomly assigned (i.e., potentially a host in the network that holds valuable information for the attacker). The attacker could gain access via an Escalation of Privilege attack, where a series of hosts are exploited and used as a stepping-stone in the attack scenario. The simulation networks were generated with the same settings as described in connection with the example SaaS cloud system 1000. It was further assumed that the clients were hosted on a single cloud physical infrastructure. In the simulation, the number of hosts, a number of vulnerabilities, and types of threat(s) for each vulnerability were taken as variables.

It was investigated how often the optimal countermeasure/solution taking into account all threat categories (i.e., a generic countermeasure) was also the optimal countermeasure for each threat-specific scenario (i.e., a threat-specific countermeasure). If the generic countermeasure was the same as the threat-specific countermeasure, then there would be no need to carry out a threat-specific risk evaluation. Two countermeasures were considered for this analysis: (a) a vulnerability patch, and (b) host isolation based on host risk. For simulations, the number of hosts and vulnerabilities were varied to examine how many threat-specific countermeasures matched, or overlapped, with the generic countermeasures. The network components 112, 114, 116 were connected randomly with the density value of 0.15 (i.e., on average, a component 112, 14, 116 is connected to 15% of the network nodes). Since there were six categories of the STRIDE threatmodel, the maximum overlap value was six. Simulations were performed 100 times and the average value was taken for the results. For varying the number of hosts, the number of vulnerabilities was fixed to be three. For varying the number of vulnerabilities, the number of hosts was fixed to be 40.

Figure 11A:
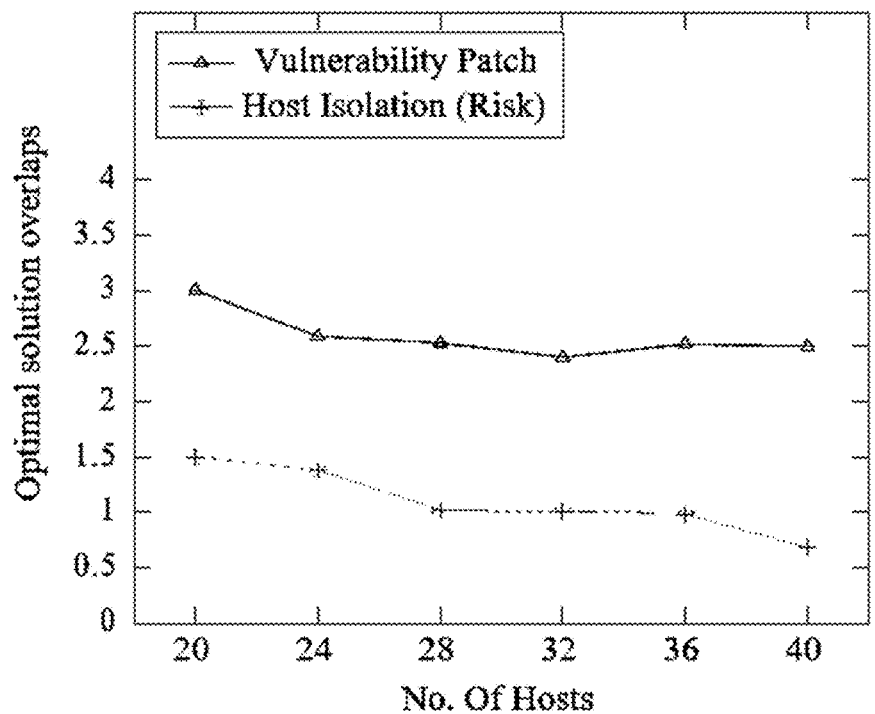
FIGS. 11A and 11B illustrate example graphs showing the number of overlapping optimal solutions between a global threat method and a threat-specific method of the present disclosure.
Figure 11B:
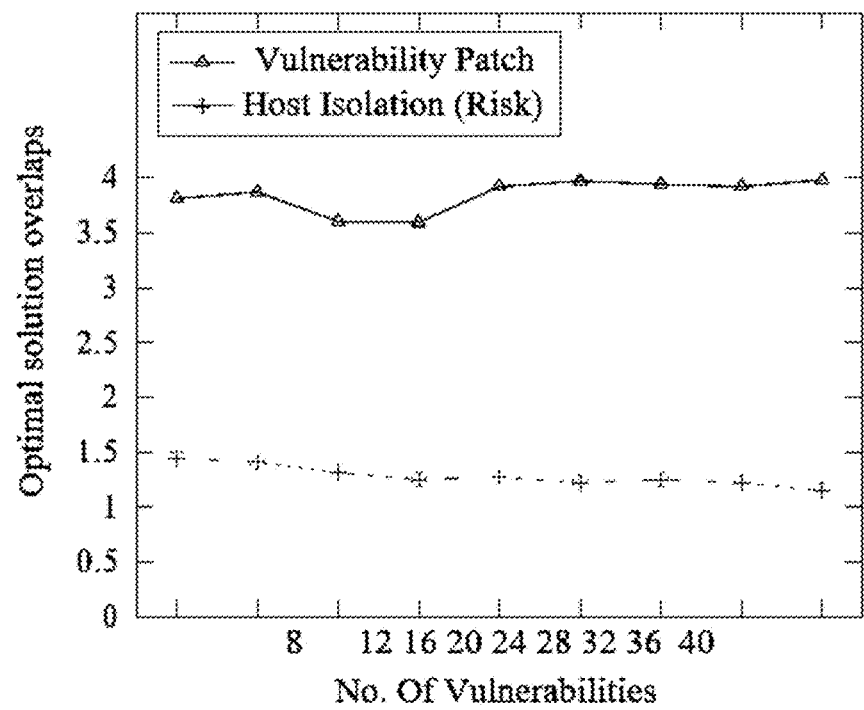

As the number of hosts was increased, the general trend was that the number of threat-specific countermeasures overlapping with the generic countermeasures reduced for the host isolation countermeasure, but only moderately reduced for the vulnerability patching countermeasure. The results are illustrated in FIG. 11A. Such results demonstrated that the overlap trend varies depending on the countermeasure to be deployed and strongly indicated that for larger sized networks (a typical scenario of the cloud), it is difficult to correlate the generic countermeasure to each threat-specific countermeasure (i.e., there was a low number of overlapping countermeasures). That is, the optimal solution varies for both the threat-specific countermeasures and the generic countermeasures as the size of the network grows. A similar but weaker trend was observed when the number of vulnerabilities was changed, as is illustrated in FIG. 11B. The overlapping countermeasures stayed relatively constant as the number of vulnerabilities was increased. However, the results still showed no strong positive correlation between the generic solution and the threat-specific solution as the maximum overlap was still less than four out of a maximum of six. Therefore, the results showed that a generic countermeasure is not suitable when considering the threat-specific risk evaluation of the present disclosure.

The effectiveness of the three countermeasures described above was also analyzed when the importance of the threats 132, 134, 136, 138 was different. This analysis demonstrated a changing optimal countermeasure for different threats 132, 134, 136, 138 in different network settings. For each mitigation technique, the optimal countermeasure that minimized the system risk 176 of the example SaaS cloud system 1000 was computed. For the simulation, the number of vulnerabilities was fixed to be three, and each component 112, 114, 116 was connected with the density value of 0.15 (similar to the previous simulation). For this simulation, the system risk 176 was based on the aggregation of path risks 172 of the simulation network calculated according to Equations 6 and 7.

Figure 12A:
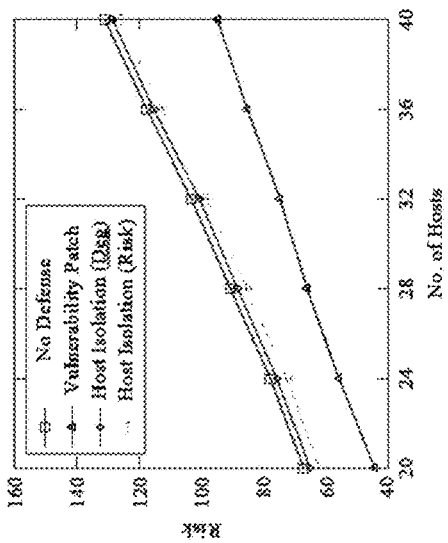
FIGS. 12A, 12B, 12C, 12D, 12E, and 12F illustrate example graphs showing the effectiveness of different countermeasures for a threat-specific risk evaluation of the present disclosure.
Figure 12B:
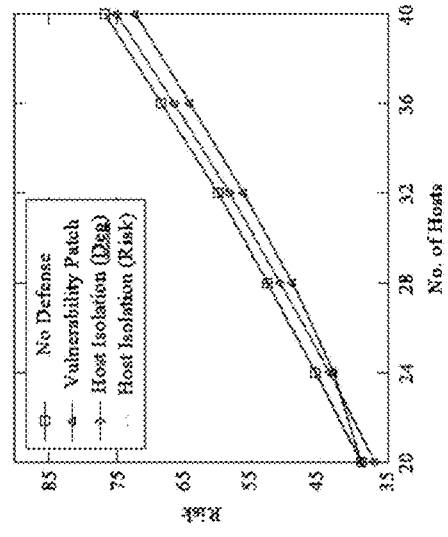
Figure 12C:
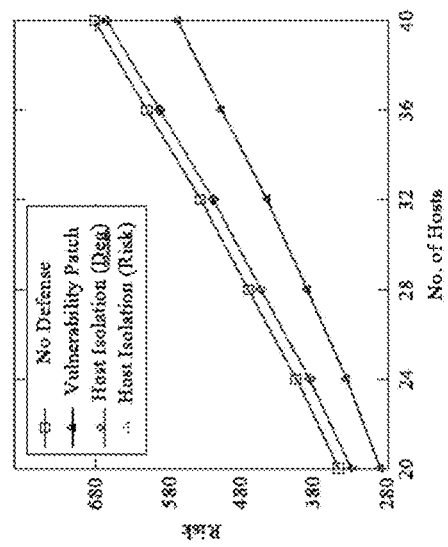
Figure 12D:
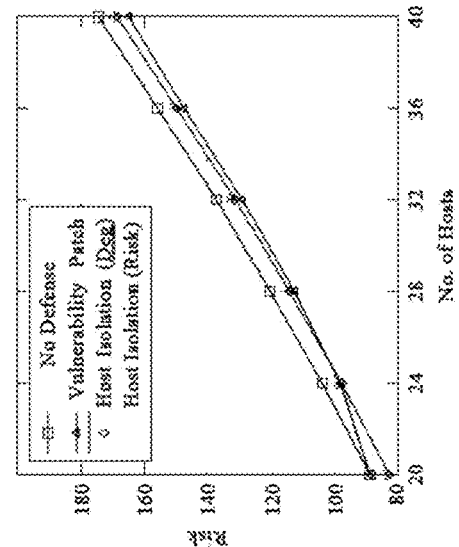
Figure 12E:
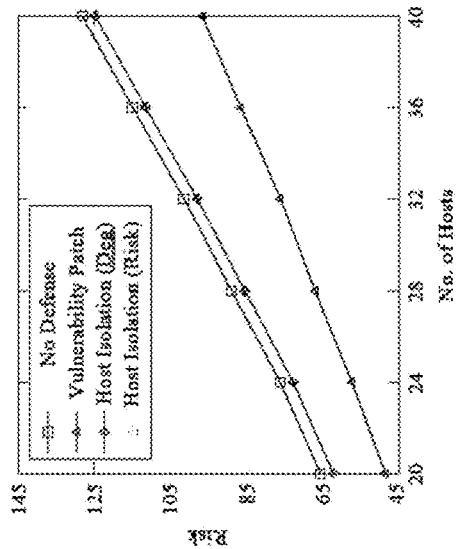
Figure 12F:
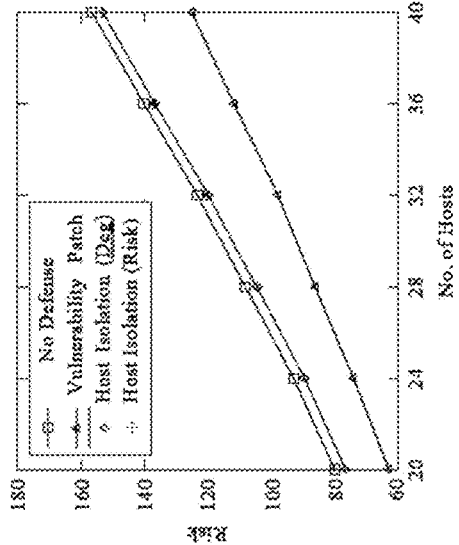

FIGS. 12A, 12B, 12C, 12D, 12E, and 12F illustrate the simulation results for comparing the effectiveness of the three countermeasures with regard to different threats 132, 134, 136, 138 and a varying number of hosts. FIG. 12A illustrates the results when all threat categories were considered. FIG. 12B illustrates the results when only Spoofing threats 132, 134, 136, 138 were considered. FIG. 12C illustrates the results when only Tampering threats 132, 134, 136, 138 were considered. FIG. 12D illustrates the results when only Information Disclosure threats 132, 134, 136, 138 were considered. FIG. 12E illustrates the results when only Denial-of-Service threats 132, 134, 136, 138 were considered. FIG. 12F illustrates the results when only Elevation of Privilege threats 132, 134, 136, 138 were considered.

FIGS. 12A, 12D, and 12E illustrate that the same solution trend was observed when considering all threats 132, 134, 136, 138, only Denial-of-Service threats 132, 134, 136, 138, and only Information Disclosure threats 132, 134, 136, 138 when the number of hosts was changed. There are some threat categories that will have the same optimal solution as the generic countermeasure, and in this case the Denial-of-Service and Information Disclosure threats categories had the same solutions as the generic countermeasure.

On the other hand, FIGS. 12B, 12C, and 12F illustrate that Spoofing, Tampering, and Elevation of Privilege threats 132, 134, 136, 138 showed different trends of system risk 176 as compared to considering all threat categories (FIG. 12A). Since vulnerabilities 142, 144 pose different threats 132, 134, 136, 138 with different threat weighting values 122, 124, 126, 128, and are associated with different assets in the networked system 102, the best countermeasure differed when a critical threat was selected (e.g., a threat with the highest amount of risk). For example, when Elevation of Privilege threats 132, 134, 136, 138 were considered, all countermeasures performed similarly, but when Tampering threats 132, 134, 136, 138 were considered, a vulnerability patch performed better than the other countermeasures. Additionally, when the number of hosts was small, a patching vulnerability countermeasure was not the optimal solution for Elevation of Privilege threats 132, 134, 136, 138 whereas it was the optimal solution for any number of hosts when taking into account all threat categories. The results showed that a single countermeasure may not necessarily be the best solution for all threat categories. Thus, the present technology allows for selecting a threat-specific countermeasure based on a threat-specific risk evaluation, rather than merely selecting a generic countermeasure that applies to all threat categories. Such threat-specific countermeasures allow for security administrators to offer better services to clients and for clients' networked systems 102 to be better protected from attacks.

As illustrated in FIGS. 12B and 12F, when considering Spoofing and Elevation of Privilege threats 132, 134, 136, 138, the optimal countermeasure (i.e., the countermeasure with the lowest risk on the graph) differed based on the number of hosts in the client networked system 102. This demonstrated that a security decision maker must consider the network configuration/topology in addition to the threat category of interest when determining an optimal countermeasure. For example, when considering Spoofing threats 132, 134, 136, 138, the optimal countermeasure when the number of hosts was small was to deploy host isolation based on network topology, which means in a smaller network, the connectivity configuration outweighed the vulnerability importance. Similar results were seen when considering Elevation of Privilege threats 132, 134, 136, 138.

Thus, the presently disclosed experimental analysis via simulations demonstrated that a generic countermeasure cannot provide the optimal solution for each threat category. Further, different countermeasures had different amounts of effectiveness when threat-specific risk evaluation was performed. The experimental analysis results showed that threat-specific risk evaluation leads to the selection of more effective countermeasures against threats 132, 134, 136, 138. Therefore, the present technology for threat-specific risk evaluation provides an improvement to security practices to satisfy different user security objectives.

It should be appreciated that the present technology described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

Certain non-limiting embodiments and figures of the present disclosure are further disclosed in the following publication, which is hereby incorporated by reference: Nhlabatsi, Armstrong, J. B. Hong, D. S. D. Kim, R. Fernandez, A. Hussein, N. Fetais, and K. M. Khan, Threat-specific Security Risk Evaluation in the Cloud, *IEEE Transactions on Cloud Computing*, pp. 1-1 (Nov. 23, 2018), available in pre-print form at https://ieeexplore.ieee.org/document/8543671.

Without further elaboration, it is believed that one skilled in the art can use the preceding description to utilize the present technology to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

The invention is claimed as follows:

1. A method for providing network security risk evaluation, the method comprising:
   (A) identifying, using at least one threat categorization model, a plurality of threats to a first component of a networked system;
   (B) assigning a plurality of weighting values to the plurality of threats, wherein at least one of the assigned weighting values is equal to zero;
   (C) identifying a plurality of vulnerabilities of the first component by accessing a database of vulnerabilities that stores vulnerability information;
   (D) determining a relevant threat set for a first vulnerability of the plurality of vulnerabilities based on the first vulnerability and the plurality of weighting values assigned to the plurality of threats and including eliminating threats from the plurality of threats that are not related to the first vulnerability, wherein the relevant threat set comprises one or more of the plurality of threats, and wherein the threats having an assigned weighting value equal to zero are excluded from the relevant threat set;
   (E) repeating step (D) for each of the plurality of vulnerabilities to determine a plurality of relevant threat sets; and
   (F) calculating a component risk of the first component based on the plurality of relevant threat sets.

2. The method of claim 1, wherein the networked system comprises a plurality of components and the method further comprises repeating steps (A)-(F) for each of the plurality of components.

3. The method of claim 2, wherein the networked system comprises a subsystem, wherein the subsystem comprises two or more components from the plurality of components, and wherein the method further comprises calculating a subsystem risk of the subsystem based on the component risk of each component in the subsystem.

4. The method of claim 2, wherein the method further comprises calculating a system risk of the networked system based on the component risk of each of the plurality of components.

5. The method of claim 2, wherein the method further comprises selecting a path of successive components from the plurality of components and calculating a path risk of the path of successive components.

6. The method of claim 1, wherein the first component comprises a plurality of subcomponents and the method comprises performing steps (A)-(F) to calculate a subcomponent risk of a first subcomponent of the first component.

7. The method of claim 1, wherein the method comprises selecting a subset of threats from the plurality of relevant threat sets and calculating the component risk of the first component based on the subset of threats.

8. The method of claim 1, wherein the first component has an overall impact value and an overall exploitability value, and wherein calculating the component risk of the first component comprises computing a product of: the overall impact value, the overall exploitability value, and a sum of the plurality of weights assigned to the plurality of threats in the plurality of relevant threat sets.

9. The method of claim 8, wherein each of the plurality of vulnerabilities has an impact value and a failure to exploit value, and the overall impact value of the first component is a sum of the impact values of each of the plurality of vulnerabilities and the overall exploitability value of the first component is a sum of the failure to exploit values of each of the plurality of vulnerabilities.

10. A network security risk evaluation apparatus comprising:
a processor; and
a memory storing instructions which, when executed by the processor, cause the processor to:
(A) identify, using at least one threat categorization model, a plurality of threats to a first component of a networked system;
(B) assign a plurality of weighting values to the plurality of threats, wherein at least one of the assigned weighting values is equal to zero;
(C) identify a plurality of vulnerabilities of the first component by accessing a database of vulnerabilities that stores vulnerability information;
(D) determine a relevant threat set for a first vulnerability of the plurality of vulnerabilities based on the first vulnerability and the plurality of weighting values assigned to the plurality of threats and including eliminating threats from the plurality of threats that are not related to the first vulnerability, wherein the relevant threat set comprises one or more of the plurality of threats, and wherein the threats having an assigned weighting value equal to zero are excluded from the relevant threat set;
(E) repeat step (D) for each of the plurality of vulnerabilities to determine a plurality of relevant threat sets; and
(F) calculate a component risk of the first component based on the plurality of relevant threat sets.

11. The apparatus of claim 10, wherein the networked system comprises a plurality of components and the memory stores instructions which, when executed by the processor, further cause the processor to repeat steps (A)-(F) for each of the plurality of components.

12. The apparatus of claim 11, wherein the networked system comprises a subsystem, wherein the subsystem comprises two or more components from the plurality of components, and wherein the memory stores instructions which, when executed by the processor, further cause the processor to calculate a subsystem risk of the subsystem based on the component risk of each component in the subsystem.

13. The apparatus of claim 11, wherein the memory stores instructions which, when executed by the processor, further cause the processor to calculate a network risk of the networked system based on the component risk of each of the plurality of components.

14. The apparatus of claim 11, wherein the memory stores instructions which, when executed by the processor, further cause the processor to select a path of successive components from the plurality of components and calculate a path risk of the path of successive components.

15. The apparatus of claim 10, wherein the memory stores instructions which, when executed by the processor, further cause the processor to select a subset of threats from the plurality of relevant threat sets and calculate the component risk of the first component based on the subset of threats.

16. The apparatus of claim 10, wherein the first component has an overall impact value and an overall exploitability value, and wherein calculating the risk of the first component comprises computing a product of: the overall impact value, the overall exploitability value, and a sum of the plurality of weights assigned to the plurality of threats in the plurality of relevant threat sets.

17. The apparatus of claim 16, wherein each of the plurality of vulnerabilities has an impact value and a failure to exploit value, and the overall impact value of the first component is a sum of the impact values of each of the plurality of vulnerabilities and the overall exploitability value of the first component is a sum of the failure to exploit values of each of the plurality of vulnerabilities.

18. A non-transitory, computer-readable medium storing instructions which, when performed by a processor, cause the processor to:
(A) identify, using at least one threat categorization model, a plurality of threats to a first component of a networked system;
(B) assign a plurality of weighting values to the plurality of threats, wherein at least one of the assigned weighting values is equal to zero;
(C) identify a plurality of vulnerabilities of the first component by accessing a database of vulnerabilities that stores vulnerability information;
(D) determine a relevant threat set for a first vulnerability of the plurality of vulnerabilities based on the first vulnerability and the plurality of weighting values assigned to the plurality of threats and including eliminating threats from the plurality of threats that are not related to the first vulnerability, wherein the relevant threat set comprises one or more of the plurality of threats, and wherein the threats having an assigned weighting value equal to zero are excluded from the relevant threat set;
(E) repeat step (D) for each of the plurality of vulnerabilities to determine a plurality of relevant threat sets; and
(F) calculate a component risk of the first component based on the plurality of relevant threat sets.

* * * * *